(12) United States Patent
Drews et al.

(10) Patent No.: US 11,623,427 B2
(45) Date of Patent: Apr. 11, 2023

(54) WIPES HAVING HIGH SUSTAINABLE CONTENT

(71) Applicants: FITESA GERMANY GMBH, Peine (DE); FITESA SIMPSONVILLE, INC., Simpsonville, SC (US)

(72) Inventors: Gary Drews, Greenville, SC (US); Elena Novarino, Hannover (DE); Stefanie Streich, Edemissen (DE); Jason Hamilton, Peine (DE); Stephen Chester, Simpsonville, SC (US); Alfredo Izzo, Peine (DE); David Newkirk, Greer, SC (US)

(73) Assignees: FITESA GERMANY GMBH, Peine (DE); FITESA SIMPSONVILLE, INC., Simpsonville, SC (US)

( * ) Notice: Subject to any disclaimer, the term of this patent is extended or adjusted under 35 U.S.C. 154(b) by 0 days.

(21) Appl. No.: 17/851,194

(22) Filed: Jun. 28, 2022

(65) Prior Publication Data
US 2022/0332086 A1     Oct. 20, 2022

Related U.S. Application Data

(63) Continuation of application No. 16/490,026, filed as application No. PCT/IB2018/051314 on Mar. 1, 2018, now Pat. No. 11,420,414.
(Continued)

(51) Int. Cl.
*B32B 5/26* (2006.01)
*B32B 7/05* (2019.01)
(Continued)

(52) U.S. Cl.
CPC ............... *B32B 5/26* (2013.01); *B08B 1/006* (2013.01); *B32B 5/022* (2013.01); *B32B 5/269* (2021.05);
(Continued)

(58) Field of Classification Search
CPC ........ D04H 1/5412; D04H 1/56; D04H 3/011; D04H 3/015; D04H 3/153; D04H 3/16
See application file for complete search history.

(56) References Cited

U.S. PATENT DOCUMENTS

2004/0115431 A1     6/2004  Chen et al.
2008/0287026 A1*   11/2008  Chakravarty ............. B32B 5/08
                                                      156/60
(Continued)

FOREIGN PATENT DOCUMENTS

| WO | 2015066300 A1 | 5/2015 |
|----|---------------|--------|
| WO | 2015073429 A1 | 5/2015 |
| WO | 2015112844 A1 | 7/2015 |

OTHER PUBLICATIONS

"Hostapur SAS", Clariant, 2012, Slide 3, https://www.essentialingredients.com/pdf/HostapurSAS.pdf (Year: 2012).
(Continued)

*Primary Examiner* — Jasper Saberi
(74) *Attorney, Agent, or Firm* — Rimon, P.C.

(57) ABSTRACT

A method of preparing a cleaning wipe having a high sustainable polymer content is provided. The cleaning wipe includes a fibrous layer having fibers of a melt spinnable sustainable polymer; and an abrasive layer having meltblown fibers of a melt spinnable sustainable polymer. The abrasive layer defining an outer surface of the cleaning wipe, and includes a plurality of abrasive structures formed thereon in which the abrasive structures are formed from conglomerated fibers, meltblown shot, fibers having average diameters greater than 4 micrometers and fibers having a tortuous geometry. The melt spinnable sustainable polymer content of the cleaning wipe is at least 50 weight % by weight of the cleaning wipe. A method of preparing the cleaning wipe is also provided.

20 Claims, 5 Drawing Sheets

Related U.S. Application Data

(60) Provisional application No. 62/465,903, filed on Mar. 2, 2017.

(51) Int. Cl.

| | | |
|---|---|---|
| *B08B 1/00* | (2006.01) | |
| *B32B 5/02* | (2006.01) | |
| *D04H 1/54* | (2012.01) | |
| *D04H 3/16* | (2006.01) | |
| *D04H 1/541* | (2012.01) | |
| *D04H 1/56* | (2006.01) | |
| *D04H 3/011* | (2012.01) | |
| *D04H 3/015* | (2012.01) | |
| *D04H 3/153* | (2012.01) | |
| *A47L 13/16* | (2006.01) | |

(52) U.S. Cl.
CPC ............... *B32B 7/05* (2019.01); *D04H 1/54* (2013.01); *D04H 1/5412* (2020.05); *D04H 1/56* (2013.01); *D04H 3/011* (2013.01); *D04H 3/015* (2013.01); *D04H 3/153* (2013.01); *D04H 3/16* (2013.01); *A47L 13/16* (2013.01); *B32B 2262/0276* (2013.01); *B32B 2262/12* (2013.01); *B32B 2262/14* (2013.01); *B32B 2307/718* (2013.01); *B32B 2307/7163* (2013.01); *B32B 2307/744* (2013.01); *B32B 2432/00* (2013.01)

(56) References Cited

U.S. PATENT DOCUMENTS

| | | |
|---|---|---|
| 2012/0177888 A1 | 7/2012 | Escafere et al. |
| 2012/0237718 A1 | 9/2012 | Weisman et al. |
| 2012/0315225 A1 | 12/2012 | Porbeni et al. |
| 2014/0053870 A1 | 2/2014 | Tuman et al. |
| 2015/0128364 A1 | 5/2015 | Dooley et al. |
| 2016/0333509 A1 | 11/2016 | Novarino et al. |

OTHER PUBLICATIONS

Bresee, et al. "Shot Development in Meltblown Webs". The Journal of the Textile Institute, vol. 89, No. 2, pp. 304-319 (Jan. 1, 1998).

\* cited by examiner

WIPES HAVING HIGH SUSTAINABLE CONTENT

CROSS REFERENCE TO RELATED APPLICATIONS

This application is a Continuation of U.S. application Ser. No. 16/490,026, filed Aug. 29, 2019 (Allowed), which is a 371 of International Application No. PCT/IB2018/051314, filed Mar. 1, 2018, which claims benefit of Provisional Application No. 62/465,903, filed Mar. 2, 2017, the contents of which are hereby incorporated by reference in its entirety.

FIELD

The presently-disclosed invention relates generally to cleaning wipes, and more particularly to cleaning wipes comprised of a spunbond nonwoven layer and a meltblown layer in which both layers have a high sustainable polymer content.

BACKGROUND

Abrasive cleaning pads and wipes are commonly used in many cleaning applications, including personal, home, commercial, and industrial applications. Traditionally, such cleaning pads and wipes include a layer having an abrasive material for removing so-called "stuck-on" materials that are difficult to remove, and an absorbent layer comprising an absorbent material, such as a sponge, foamed, or cellulose material.

However, such traditional cleaning pads and wipes may be expensive, and therefore unsuitable for a disposable or single use product. To address this concern, various wipes have been developed that include a multi-layered construction in which an abrasive layer is formed of coarse synthetic polymer fibers, and an absorbent layer is formed of a fibrous material. An example of such a wipe is described in U.S. Patent Publication No. 2005/0136772 to Chen et al. Chen describes a cleaning wipe or pad having an abrasive layer formed of meltblown synthetic fibers, and an absorbent layer formed of absorbent pulp fibers that are mixed with synthetic meltblown fibers. The presence of the synthetic meltblown fibers in the absorbent layer helps to improve bonding between the synthetic fibers of the abrasive layer to the synthetic fibers of the absorbent layer. Examples of thermoplastic polymers for use in preparing the synthetic fibers of Chen include polyethylenes, polypropylenes, polyesters, polyamides, polystyrenes, and the like.

These so-called synthetic polymers are generally very stable and can remain in the environment for a long time. Recently, however, there has been a trend to develop articles and products that are considered environmentally friendly and sustainable. As part of this trend, there has been a desire to produce ecologically friendly products comprised of increased sustainable content in order to reduce the content of petroleum based materials.

Accordingly, there still exists a need for abrasive cleaning pads and wipes having a high sustainable content.

SUMMARY

One or more embodiments of the invention may address one or more of the aforementioned problems. In one embodiment, aspects of the present invention are directed to cleaning wipes or pads (hereinafter referred to as a "cleaning wipe") for use in cleaning a surface through wiping or scrubbing. More specifically, aspects of the invention are directed to a cleaning wipe having a high sustainable polymer content.

Certain embodiments according to the invention provide a multilayer cleaning wipe comprising an abrasive layer that is attached to a fibrous layer, and in which the abrasive layer defines an outer surface of the cleaning wipe, and wherein the sustainable polymer content of the cleaning wipe is at least 50% by weight of the cleaning wipe.

The abrasive layer comprises a meltblown web in which the surface of the web is characterized as having abrasive structures formed therein. The abrasive structures comprise conglomerated fibers in which multiple fibers are joined, married, or otherwise fused to adjacent fibers, fibers having average fiber diameters in excess of 4 micrometers, meltblown shot, and fibers having a tortuous geometry in which the fibers are characterized as having twists, kinks, coils, and the like. The process conditions for preparing the meltblown web are selected to produce a cleaning wipe having a desired level of abrasiveness. For example, a meltblown web exhibiting a greater number of abrasive structures will exhibit a greater degree of coarseness or abrasiveness in comparison to a cleaning wipe having less abrasive structures on the surface of the meltblown web.

The fibrous layer provides support and integrity for the abrasive layer while also supplying a surface having softness and drapeabilty. In one embodiment, the fibrous layer comprises a plurality of fibers that are bonded to each other to form a coherent web. The fibrous layer may be formed from a wide variety of nonwoven webs including carded webs and spunbond webs. Preferably, the fibrous layer comprises a spunbond nonwoven fabric comprised of a plurality of continuous filaments that are bonded to each other to form the fabric.

The fibrous layer and abrasive layer both comprise one or more sustainable polymers. In accordance with certain embodiments, the fibrous layer comprises a spunbond nonwoven fabric that is substantially free of synthetic polymer components, such as petroleum-based materials and polymers. For example, the spunbond nonwoven fabric may have a monocomponent structure in which 100% of the fiber comprises a sustainable polymer, or may have a bicomponent structure in which the both components comprise a sustainable polymer to thus produce a fiber having a 100% sustainable polymer content.

In a preferred embodiment, the sustainable polymer comprises polylactic acid (PLA).

A method and system for preparing the cleaning wipe is also provided.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
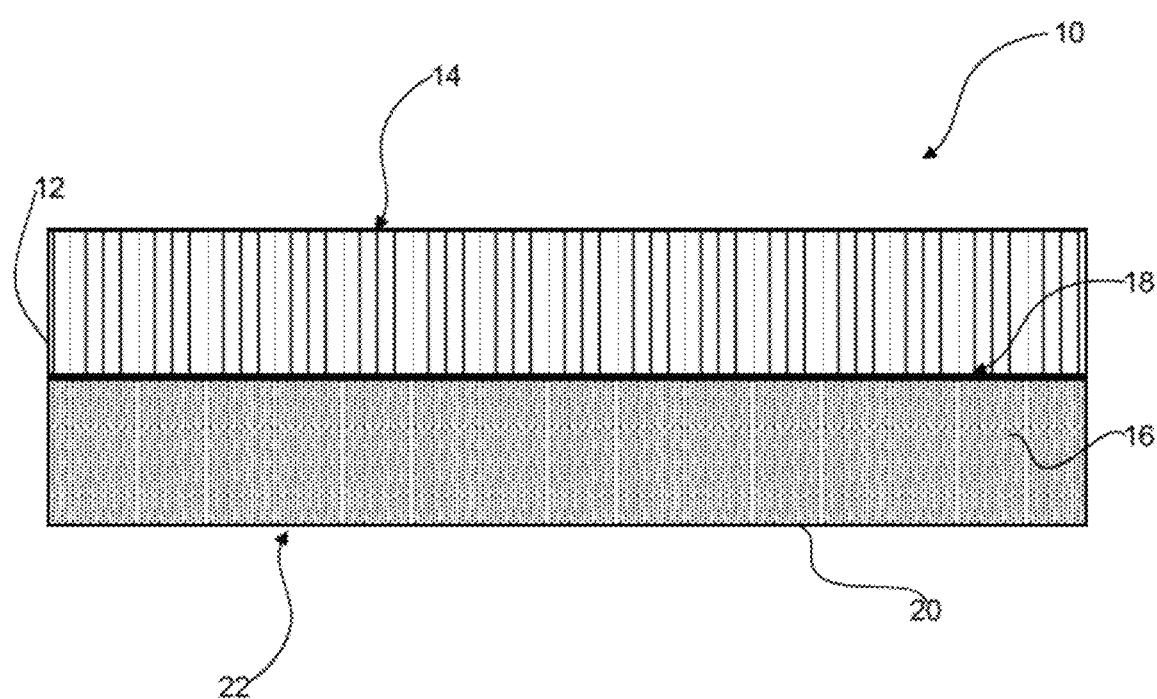
FIG. 1 is a cross-sectional view of a cleaning wipe in accordance with certain embodiments of the invention.

The invention now will be described more fully hereinafter with reference to the accompanying drawings, in which some, but not all embodiments of the inventions are shown. Indeed, this inventions may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

I. Definitions

For the purposes of the present application, the following terms shall have the following meanings:

The term "fiber" can refer to a fiber of finite length or a filament of infinite length.

As used herein, the term "monocomponent" refers to fibers formed from one polymer or formed from a single blend of polymers. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The at least two polymers can each independently be the same or different from each other, or be a blend of polymers. The polymers are arranged in substantially constantly positioned distinct zones across the cross-section of the fibers. The components may be arranged in any desired configuration, such as sheath-core, side-by-side, pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference.

As used herein, the terms "nonwoven," "nonwoven web" and "nonwoven fabric" refer to a structure or a web of material which has been formed without use of weaving or knitting processes to produce a structure of individual fibers or threads which are intermeshed, but not in an identifiable, repeating manner. Nonwoven webs have been, in the past, formed by a variety of conventional processes such as, for example, meltblown processes, spunbond processes, and staple fiber carding processes.

As used herein, the term "meltblown" refers to a process in which fibers are formed by extruding a molten thermoplastic material through a plurality of fine, usually circular, die capillaries into a high velocity gas (e.g. air) stream which attenuates the molten thermoplastic material and forms fibers, which can be to microfiber diameter. Thereafter, the meltblown fibers are carried by the gas stream and are deposited on a collecting surface to form a web of random meltblown fibers. Such a process is disclosed, for example, in U.S. Pat. No. 3,849,241 to Buntin et al.

As used herein, the term "machine direction" or "MD" refers to the direction of travel of the nonwoven web during manufacturing.

As used herein, the term "cross direction" or "CD" refers to a direction that is perpendicular to the machine direction and extends laterally across the width of the nonwoven web.

As used herein, the term "spunbond" refers to a process involving extruding a molten thermoplastic material as filaments from a plurality of fine, usually circular, capillaries of a spinneret, with the filaments then being attenuated and drawn mechanically or pneumatically. The filaments are deposited on a collecting surface to form a web of randomly arranged substantially continuous filaments which can thereafter be bonded together to form a coherent nonwoven fabric. The production of spunbond non-woven webs is illustrated in patents such as, for example, U.S. Pat. Nos. 3,338,992; 3,692,613, 3,802,817; 4,405,297 and 5,665,300. In general, these spunbond processes include extruding the filaments from a spinneret, quenching the filaments with a flow of air to hasten the solidification of the molten filaments, attenuating the filaments by applying a draw tension, either by pneumatically entraining the filaments in an air stream or mechanically by wrapping them around mechanical draw rolls, depositing the drawn filaments onto a foraminous collection surface to form a web, and bonding the web of loose filaments into a nonwoven fabric. The bonding can be any thermal or chemical bonding treatment, needling, or hydroentangling, with thermal point bonding being preferred.

As used herein, the term "thermal point bonding" involves passing a material such as one or more webs of fibers to be bonded between a heated calender roll and an anvil roll. The calender roll is typically patterned so that the fabric is bonded in discrete point bond sites rather than being bonded across its entire surface.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material, including isotactic, syndiotactic and random symmetries.

In the context of the present invention, the term "sustainable" refers to a material derived from natural processes such agriculture or forestry that are renewed or replenished to remain available for future generations. Sustainable polymers can thus be contrasted with petroleum sourced polymers (also referred to as synthetic polymers) where the supply of petroleum is not naturally replenished in a reasonable length of time. Sustainable polymers suitable for embodiments of the present invention typically have a sustainable content that is at least 25 weight percent on the weight percent of the sustainable polymer content, and more typically at least 50 weight percent, with a weight percent of at least 75%, and at least 90% being somewhat more typical. In a preferred embodiment, the sustainable polymer component comprises from 90 to 100 weight percent of sustainable content. In addition, sustainable polymers for use in the present invention are those that are melt spinnable, and thus can be used in melt spinning processes, such as spunbonding and meltblowing processes.

In some embodiments, the sustainable polymer content may comprise bio-based or biodegradable polymer materials. "Biodegradable" refers to a material or product which degrades or decomposes under environmental conditions that include the action of microrganisms. Thus a material is considered as biodegradable if a specified reduction of tensile strength and/or of peak elongation of the material or other critical physical or mechanical property is observed after exposure to a defined biological environment for a defined time. Depending on the defined biological conditions, a product comprised of a bio-based material might or might not be considered biodegradable.

A special class of biodegradable product made with a bio-based material might be considered as compostable if it can be degraded in a composing environment. The European standard EN 13432, "Proof of Compostability of Plastic Products" may be used to determine if a fabric or film comprised of sustainable content could be classified as compostable.

Embodiments of the present invention are directed to a cleaning wipe having a high sustainable polymer content. Preferably, cleaning wipes in accordance with the embodiments of the present invention have a sustainable polymer content of at least 50% by weight of the cleaning wipe, such as comprising a sustainable polymer content ("SPC") that is at least 60%, 65%, 70%, 75%, 80%, 85%, 90%, or 95% by weight of the cleaning wipe. In a preferred embodiment, the cleaning wipes in accordance with the invention may have a 100% SPC content by weight of the cleaning wipe.

As used herein, "100% SPC" may also include up to 5% additives including additives and/or masterbatches of additives to provide, by way of example only, color, softness, slip, antistatic protection, lubricity, hydrophilicity, liquid repellency, antioxidant protection and the like. In this regard, the abrasive layer may comprise 95-100% SPC, such as from 96-100% SPC, 97-100% SPC, 98-100% SPC, 99-100% SPC, etc. When such additives are added as a masterbatch, for instance, the masterbatch carrier may primarily comprise the same or similar sustainable polymer in order to facilitate processing and to maximize sustainable content within the formulation.

With reference to FIG. 1, a cleaning wipe in accordance with at least one embodiment of the invention is shown and designated by reference character 10. As discussed in greater detail below, the cleaning wipe comprises two or more layers. In the illustrated embodiment, the cleaning wipe 10 includes an abrasive layer 12, which defines an outer surface 14 of the wipe, and a second fibrous layer 16. The second fibrous layer 16 includes a first outer surface that is attached to an opposite surface of the abrasive layer, and a second outer surface that in some embodiments may define a second outer surface of the cleaning wipe. As explained below, abrasive layer 12 and second fibrous layer 16 both comprise materials having a high sustainable polymer content.

Although the illustrated embodiment shows a cleaning wipe having two layers, it should be recognized that in some embodiments the cleaning wipe may include additional layers, such as three or more layers, four or more layers, five or more layers, etc.

II. The Abrasive Layer

The abrasive layer 12 comprises a meltblown web that has been processed in order to have a desired abrasiveness for a given application. For instance, the materials and processing conditions for the meltblown web may be selected and designed with a view to the ultimate end use of the cleaning wipe. For example, a cleaning wipe for cleaning a wood surface may include an abrasive layer which is softer or less rough than a cleaning wipe designed for use on a kitchen surface, such as a stove top.

The outer surface of the abrasive layer is characterized by the presence of abrasive structures. In general, the greater number of abrasive structures that are present on the surface of the meltblown web, the greater the coarseness or abrasiveness of the surface. Typically, the outer surface includes two or more abrasive structures comprising 1) conglomerated fibers in which multiple fibers are joined, married, or otherwise fused to adjacent fibers, 2) meltblown shot, 3) fibers having average diameters greater than 4 micrometers and 4) fibers having a tortuous geometry in which the fibers are characterized as having twists, kinks, coils, loops, and the like. In this regard, FIGS. 4A-5B are SEM images of the surface of three different meltblown webs having different degrees of abrasiveness. As can be seen in the images, the surfaces of all three meltblown webs may be characterized as having conglomerated fibers, meltblown shot, and fibers having a tortuous geometry.

Generally, in the manufacture of conventional meltblown materials, high velocity air is typically used to attenuate the polymeric strands to create fine, thin fibers. In embodiments of the present invention, a meltblown web having increased abrasiveness may be created by adjusting one or more of the meltblown process conditions, such as air temperature, air volume, distance of the spinnerets to the web collection surface, and the like to thereby produce abrasive structures on surface of the meltblown web. For example, in one embodiment, an abrasive meltblown web may be produced by adjusting conditions of the air flow system, such as by increasing the air flow area or otherwise decreasing the velocity of the air stream immediately adjacent the molten polymeric strands as they emerge from the meltblown die head. By adjusting the air flow it is possible to prevent or retard substantial attenuation of the fiber diameter (or reduce the degree of fiber attenuation), which may increase fiber coarseness, which may then increase the abrasiveness of the layer formed by the fibers.

In addition, process conditions, such as airflow, may be used to create so-called "shot" within the meltblown web. Shot refers to portions of the web where individual meltblown fibers have combined or conglomerated during the meltblown process to produce large, uneven globules of polymer within the meltblown web. In conventional meltblowing processes, the presence of shot would be highly undesirable. However, in the present invention, the shot may help produce increased abrasiveness and roughness in the meltblown web. In some embodiments, airflow near the die exit may be used to agitate and spread the polymeric fibers in a manner that may be highly non-uniform on the forming belt. The large degree of non-uniformity of the lay-down of coarse meltblown fibers may result in forming a meltblown web having variations in thickness and variations in basis weight across the surface of the web, i.e., an uneven surface may be created on the web, which may increase the abrasiveness of the layer formed by the fibers.

Further, non-uniform spread of the fibers during formation of the meltblown web may create a web with increased void space within the meltblown web. For example, an open network of fibers may be formed which may have open voids that occupy a substantial portion of the layer. For instance, the void volume of the abrasive layer may be greater than about 10%, particularly greater than about 50%, and more particularly greater than about 60% of the volume of the material. These open void materials may inherently have good scrubbing properties.

In addition to adjusting the process conditions, or in combination with adjusting process conditions, an abrasive meltblown web may be prepared by selection of sustainable polymers based on the molecular weight of the polymer. In this way, the median and mean fiber size of the meltblown fibers can be increased so that a mixture of fibers having larger diameters may be produced. In addition, larger fiber diameters may result in an increase in conglomeration of fibers and/or production of shot within the meltblown web. As noted previously, larger fibers may also result in an increase in open void volume within the meltblown web.

As noted above, the abrasive layer preferably has a high sustainable polymer content. Suitable materials for use in preparing the meltblown fibers of the abrasive layer may include any sustainable polymer that is melt spinnable and suitable for preparing a meltblown web.

Nonlimiting examples of sustainable polymers may include polymers directly produced from organisms, such as polyhydroxyalkanoates (e.g., poly(beta-hydroxyalkanoate), poly(3-hydroxybutyrate-co-3-hydroxyvalerate, NODAX™), and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

In a preferred embodiment, the sustainable polymer may include polylactic acid and bio-based derived polyethylene. Generally, polylactic acid based polymers are prepared from dextrose, a source of sugar, derived from field corn. In North America corn is used since it is the most economical source of plant starch for ultimate conversion to sugar. However, it should be recognized that dextrose can be derived from sources other than corn. Sugar is converted to lactic acid or a lactic acid derivative via fermentation through the use of microorganisms. Thus besides corn, other agricultural based sugar sources may be used including rice, sugar beets, sugar cane, wheat, cellulosic materials, such as xylose recovered from wood pulping, and the like. Examples of suitable PLA resins for preparing the meltblown web are available from NatureWorks under the product name PLA Grades 6201 and 6252. In additional suitable polylactic acid resins may also be available from Corbion of Arkelsedijk 46, 4206 A C Gorinchem.

Similarly, bio-based polyethylene can be prepared from sugars that are fermented to produce ethanol, which in turn is dehydrated to provide ethylene.

In some embodiments, the meltblown fibers may comprise fibers comprising a blend of a sustainable polymer and a synthetic polymer. For example, WO 2015/112844, the contents of which are hereby incorporated by reference, describes a meltblown nonwoven comprising reclaimed meltblown fibers that are prepared by subjecting bicomponent fibers having a synthetic polymer component, such as polypropylene or polyethylene, and a sustainable polymer component, such as PLA, to a vis-breaking process in which the synthetic polymer component and sustainable polymer component are vis-broken to reduce their average molecular weight. Preferably, the vis-broken blend has an MFR to make it useful for preparation of meltblown nonwoven webs. In one embodiment, the resulting vis-broken blend has an MFR of at least about 400 to 2,500, and preferably from about 500 to 2,000, and more preferably about 700 to 1,800.

The resulting vis-broken resin is then suitable for preparation of meltblown fibers. The ratio of the synthetic polymer component to the sustainable polymer component in the meltblown web may range from about 10% synthetic polymer component to 90% sustainable polymer component to 80% synthetic polymer component to 20% sustainable polymer component, and more preferably from 30% synthetic polymer component to 70% sustainable polymer component to 70% synthetic polymer component to 30% sustainable polymer component. In some embodiments, the reclaimed blend comprising the synthetic polymer component and the sustainable polymer component may be blended with virgin polymer (never used) to form the meltblown fibers.

In accordance with certain embodiments, the abrasive layer comprises a nonwoven fabric comprising PLA meltblown fibers, and that is substantially free of synthetic polymer components, such as petroleum-based materials and polymers. For example, the abrasive layer may comprise meltblown fibers having a 100% sustainable polymer content.

In a preferred embodiment, the meltblown fibers of the abrasive layer comprise 100% PLA. As in the definition of "100% SPC," a "100% PLA" fiber may include up to 5% additives including additives and/or masterbatches of additives to provide, by way of example only, color, softness, slip, antistatic protection, lubricity, hydrophilicity, liquid repellency, antioxidant protection and the like. For example, the abrasive layer may comprise 95-100% PLA, such as from 96-100% PLA, 97-100% PLA, 98-100% PLA, 99-100% PLA, etc. In addition, when such additives are added as a masterbatch, for instance, the masterbatch carrier may primarily comprise a PLA polymer in order to facilitate processing and to maximize sustainable content within the formulation.

Meltblown webs prepared in accordance with embodiments of the present invention may have a wide variety of basis weight ranges depending on the desired application. For example, meltblown webs and laminates incorporating such meltblown webs may have basis weights ranging from about 0.25 to 20 $g/m^2$, and in particular, from about 1.5 to 3 $g/m^2$. In some embodiments, the meltblown webs may have basis weights ranging from 1 to 400 $g/m^2$, for example, from about 15 to 400 $g/m^2$.

As discussed above, the meltblowing process may be selectively adjusted to provide a meltblown web having a desired level of abrasiveness. In general, the abrasiveness of the surface of the abrasive layer correlates with the kinetic coefficient of friction for the surface layer. For example, an abrasive layer exhibiting a kinetic coefficient of friction that is from about 0.2 to 0.49 can be classified as providing a cleaning wipe having a fine surface, whereas an abrasive layer exhibiting a kinetic coefficient of friction that is greater than 1.0 can be classified as having a very coarse surface. Table 1 below summarizes the relevant classes of cleaning wipes in accordance with embodiments of the invention.

In general, individual meltblown fibers may have diameters of less than 15 microns, and in particular, diameters of less than 10 microns. In one embodiment, the meltblown fibers have diameters from about 3 to 0.5 microns, and in particular, from about 1 to 2 microns. In some embodiments, the meltblown fibers may have diameters from about 3 to less than 0.5 microns, and in particular from about 1 to 3 microns. However, depending on the meltblown processing conditions and the desired level of abrasiveness, the meltblown fibers may advantageously conglomerated with adjacent fibers to provide a married/fused meltblown fiber having an increased diameter. Table 1 provides average fiber diameter ranges for each of cleaning wipe classifications.

As noted above, the surface of the meltblown web is characterized by the presence of abrasive structures that may result from conglomerated fibers and/or fibers having larger diameters. In one embodiment, the fibers forming the meltblown web have an average fiber diameter of about 4 micrometers or greater, and in particular, about 6 micrometers, and more particularly, about 8 micrometers. In general, the wipe classification will depend on the diameter of the meltblown fibers. For example, a cleaning wipe that is considered to have a "fine" abrasive surface will typically have average fiber diameters from about 4 to 8.5 micrometers, and in particular, from about 6 to 8 micrometers. A cleaning wipe that is considered to have a "medium" abrasive surface will typically have average fiber diameters from about 8.5 to 10.5 micrometers, and in particular, from about 9.0 to 10 micrometers. A cleaning wipe that is considered to have a "course" abrasive surface will typically have average fiber diameters from about 10.5 to 12.5 micrometers, and in particular, from about 11 to 12 micrometers. Finally, a cleaning wipe that is considered to have a "very coarse" abrasive surface will typically have average fiber diameters from about 12.5 to 25 micrometers, and in particular, from about 13 to 20 micrometers.

TABLE 1

Classification of Abrasiveness correlated to the Kinetic Coefficient of Friction

| Wipe Classification | Kinetic Coefficient of Friction | Average meltblown fiber range (micrometers) |
| --- | --- | --- |
| Fine | 0.2-0.49 | 4.0-8.5 |
| Medium | 0.5-0.79 | 8.5-10.5 |
| Coarse | 0.8-0.99 | 10.5-12.5 |
| Very Coarse | 1.0 and greater | Greater than 12.5 |

As discussed in greater detail below, the Kinetic Coefficient of Friction is measured according to Method C-1231 with the exception that when conducting the measurement, two identical webs are positioned opposite each other in a face-to-face relation, and then the measurement procedure is performed. For example, in determining the Kinetic coefficient of friction of the meltblown web (i.e., abrasive layer), two identical samples of the meltblown web are positioned face-to-face.

III. Fibrous Layer

In the embodiment illustrated in FIG. 1, the fibrous layer 16 includes an inner surface 18 that is joined to the abrasive layer, and an opposite surface 20 that defines a second outer surface 22 of the cleaning wipe 10. The fibrous layer provides support and integrity for the abrasive layer while also supplying a surface having softness and drapeabilty.

In one embodiment, the fibrous layer comprises a plurality of fibers that are bonded to each other to form a coherent web, which helps to provide structural and integrity to the abrasive layer. The fibrous layer may be formed from a wide variety of nonwoven webs including carded webs, spunbond webs, and a composite structure having a spunbond/meltblown/spunbond (SMS) configuration. In this embodiment, the meltblown layer would not need to be processed under conditions to include abrasive structures. For example, the meltblown layer may primarily comprise fine meltblown fibers having diameters that are typically less than 5 micrometers. In addition, such an SMS structure may also provide liquid barrier properties to prevent a liquid on the abrasive side of the cleaning wipe from passing through the fibrous layer. In a preferred embodiment, the fibrous layer comprises a spunbond nonwoven fabric comprised of a plurality of continuous filaments that are bonded to each other to form the fabric.

As discussed above, the fibrous layer has a high sustainable polymer content. In accordance with certain embodiments, the fibrous layer comprises a spunbond nonwoven fabric that is substantially free of synthetic polymer components, such as petroleum-based materials and polymers. For example, the spunbond nonwoven fabric may have a monocomponent structure in which 100% of the fiber comprises a sustainable polymer, or may have a bicomponent structure in which the both components comprise a sustainable polymer to thus produce a fiber having a 100% sustainable polymer content.

Suitable materials for use in preparing the spunbond nonwoven fabric of the fibrous layer may include any sustainable polymer that is melt spinnable and suitable for preparing a spunbond nonwoven fabric. In this regard, it is noted that many of the same sustainable polymers that are discussed above with respect to the meltblown web, may also be used for preparing the spunbond nonwoven fabric provided such polymers are suitable for spunbond applications.

In some embodiments, sustainable polymers for use in the spunbond nonwoven fabric may be derived from an aliphatic component possessing one carboxylic acid group (or a polyester forming derivative thereof, such as an ester group) and one hydroxyl group (or a polyester forming derivative thereof, such as an ether group) or may be derived from a combination of an aliphatic component possessing two carboxylic acid groups (or a polyester forming derivative thereof, such as an ester group) with an aliphatic component possessing two hydroxyl groups (or a polyester forming derivative thereof, such as an ether group).

The term "aliphatic polyester" covers—besides polyesters which are made from aliphatic and/or cycloaliphatic components exclusively also polyesters which contain besides aliphatic and/or cylcoaliphatic units aromatic units, as long as the polyester has substantial sustainable content. As noted above, the sustainable content is typically at least 25 weight %, and more preferably 75 weight % and even more preferably at least 90 weight %.

Polymers derived from an aliphatic component possessing one carboxylic acid group and one hydroxyl group are alternatively called polyhydroxyalkanoates (PHA). Examples thereof are polyhydroxybutyrate (PHB), poly-(hydroxybutyrate-co-hydroxyvalerate) (PHBV), poly- (hydroxybutyrate-co-polyhydroxyhexanoate) (PHBH), polyglycolic acid (PGA), poly- (epsilon-caprolactone) (PCL) and preferably polylactic acid (PLA).

Examples of polymers derived from a combination of an aliphatic component possessing two carboxylic acid groups with an aliphatic component possessing two hydroxyl groups are polyesters derived from aliphatic diols and from aliphatic dicarboxylic acids, such as polybutylene succinate (PBSU), polyethylene succinate (PESU), polybutylene adipate (PBA), polyethylene adipate (PEA), polytetramethylene adipate/terephthalate (PTMAT).

In a preferred embodiment, the fibers of the spunbond nonwoven fabric comprises 100% PLA. As used herein, "100% PLA" may also include up to 5% additives including additives and/or masterbatches of additives to provide, by way of example only, color, softness, slip, antistatic protection, lubricity, hydrophilicity, liquid repellency, antioxidant protection and the like. In this regard, the nonwoven may comprise 95-100% PLA, such as from 96-100% PLA, 97-100% PLA, 98-100% PLA, 99-100% PLA, etc. When such additives are added as a masterbatch, for instance, the masterbatch carrier may primarily comprise PLA in order to facilitate processing and to maximize sustainable content within the formulation.

Generally, polylactic acid based polymers are prepared from dextrose, a source of sugar, derived from field corn. In North America corn is used since it is the most economical source of plant starch for ultimate conversion to sugar. However, it should be recognized that dextrose can be derived from sources other than corn. Sugar is converted to lactic acid or a lactic acid derivative via fermentation through the use of microorganisms. Lactic acid may then be polymerized to form PLA. Examples of such high performance PLA resins include L105, L130, L175, and LX175, all from Corbion of Arkelsedijk 46, 4206 A C Gorinchem, the Netherlands. Other examples of PLA resins include Nature Works PLA Grade PLA 6752 and NatureWorks Grade 6202.

Thus, besides corn other agricultural based sugar source could be used including rice, sugar beets, sugar cane, wheat, cellulosic materials, such as xylose recovered from wood pulping, and the like.

In some embodiments, the nonwoven fabrics may be biodegradable. "Biodegradable" refers to a material or product which degrades or decomposes under environmental conditions that include the action of microorganisms. Thus, a material is considered as biodegradable if a specified reduction of tensile strength and/or of peak elongation of the material or other critical physical or mechanical property is observed after exposure to a defined biological environment for a defined time. Depending on the defined biological conditions, a fabric comprised of PLA might or might not be considered biodegradable.

In accordance with certain embodiments, for example, the spunbond nonwoven fabric may comprise bicomponent fibers. In some embodiments, for instance, the bicomponent fibers may comprise a side-by-side arrangement. However, in other embodiments, for example, the bicomponent fibers may comprise a sheath and a core. In some embodiments, the bicomponent fibers can be made using sheath/core bicomponent fibers where the core comprises PLA, and the sheath comprises polymers including, but not limited to, polypropylene (PP), polyethylene (PE), polyethylene terephthalate (PET) and/or the like. However, in other embodiments, the nonwoven fabric may comprise bicomponent fibers where the core comprises polymers including, but not limited to, PP, PE, PET and/or the like, and the sheath comprises PLA.

In such embodiments, for instance, the sheath may comprise PLA. In further embodiments, for example, the core may comprise at least one synthetic polymer component. For example, the PLA continuous filaments may comprise a PLA sheath, and a synthetic polymer, such as PP, PE, PET, or any combination thereof.

In other embodiments, the core may comprise PLA in which the PLA may have a higher or lower melting temperature than the PLA of the sheath. In one embodiment, the bicomponent fibers may comprise PLA/PP reverse bicomponent fibers, PLA/PE reverse bicomponent fibers, PLA/PET reverse bicomponent fibers, or PLA/PLA reverse bicomponent fibers.

In certain embodiments, for instance, the bicomponent fibers may comprise PLA/PLA bicomponent fibers such that the sheath comprises a first PLA grade, the core comprises a second PLA grade, and the first PLA grade and the second PLA grade are different (e.g., the first PLA grade has a higher melting point than the second PLA grade). For example, in one embodiment, the core may comprise a PLA having a lower % D isomer of polylactic acid than that of the % D isomer PLA polymer used in the sheath. The PLA polymer with lower % D isomer will show higher degree of stress induced crystallization during spinning while the PLA polymer with higher D % isomer will retain a more amorphous state during spinning. The more amorphous sheath will promote bonding while the core showing a higher degree of crystallization will provide strength to the fiber and thus to the final bonded web. In one particular embodiment, the Nature Works PLA Grade PLA 6752 with 4% D Isomer can be used as the sheath while NatureWorks Grade 6202 with 2% D Isomer can be used as the core.

By way of example only, the sheath may comprise PLA; the core may comprise at least one synthetic polymer component. The PLA grade of the starting material should have proper molecular properties to be spun in spunbond processes. Examples of suitable include PLA grades supplied from NatureWorks LLC, of Minnetonka, Minn. 55345 such as, grade 6752D, 6100D, and 6202D believed to be produced as generally following the teaching of U.S. Pat. Nos. 5,525,706 and 6,807,973 both to Gruber et al.

Examples of synthetic polymer components include polyolefins, such as PP and PE, blends of polyolefins, such as those taught by Chester et al. in US Patent Publication No. 2014/0276517 incorporated herein in its entirety by reference, and polyesters, such as PET, polytrimethylene terephthalate (PTT), and polybutylene terephthalate (PBT), polystyrenes, and the like.

A wide variety of polypropylene polymers may be used in the starting material including both polypropylene homopolymers and polypropylene copolymers. In one embodiment, the polypropylene of the starting material may comprise a metallocene or Ziegler Natta catalyzed propylene polymers.

Examples of Ziegler Natta polypropylenes that may be used in embodiments of the present invention include TOTAL®3866 polypropylene from Total Petrochemicals USA, INC of Houston, Tex.; Braskem CP 360H polypropylene from Braskem America of Philadelphia, Pa.; ExxonMobil PD 3445 from ExxonMobil of Houston, Tex.; Sabic 511A from Sabic of Sittard, The Netherlands; and Pro-fax PH 835 from Basell Polyolefins of Wilmington, Del. Examples of suitable metallocene polypropylenes may include TOTAL® M3766 polypropylene from Total Petrochemicals USA, INC of Houston, Tex.; TOTAL® MR 2001 polypropylene from Total S.A. of Courbevoie, France; ACHIEVE® 3754 polypropylene from ExxonMobil of Houston, Tex.; and ACHIEVE® 3825 polypropylene from ExxonMobil of Houston, Tex.

For example, in one embodiment, the spunbond nonwoven fabric may comprise a bicomponent fiber having a PLA core, such as a core comprising NatureWorks PLA Grade 6202 and a polyolefin sheath, such as a sheath comprising a polypropylene available from LyondellBassell under the product name HP561R.

In accordance with certain embodiments, for example, the spunbond nonwoven fabric may have a basis weight from about 7 gsm to about 150 gsm. In other embodiments, for instance, the fabric may have a basis weight from about 8 gsm to about 70 gsm. In certain embodiments, for example, the fabric may comprise a basis weight from about 10 gsm to about 50 gsm. In further embodiments, for instance, the fabric may have a basis weight from about 11 gsm to about 30 gsm. As such, in certain embodiments, the fabric may have a basis weight from at least about any of the following: 7, 8, 9, 10, and 11 gsm and/or at most about 150, 100, 70, 60, 50, 40, and 30 gsm (e.g., about 9-60 gsm, about 11-40 gsm, etc.).

According to certain embodiments, for example, the fibers may have a linear mass density from about 1 dtex to about 5 dtex. In other embodiments, for instance, the fibers may have a dtex from about 1.5 dtex to about 3 dtex. In further embodiments, for example, the fibers may have a linear mass density from about 1.6 dtex to about 2.5 dtex. As such, in certain embodiments, the fibers have a linear mass density from at least about any of the following: 1, 1.1, 1.2, 1.3, 1.4, 1.5, and 1.6 dtex and/or at most about 5, 4.5, 4, 3.5, 3, and 2.5 dtex (e.g., about 1.4-4.5 dtex, about 1.6-3 dtex, etc.).

In some embodiments, spunbond nonwoven fabrics for use in some embodiments of the invention may be characterized by an area shrinkage of less than 5%. In further embodiments, for example, the spunbond nonwoven fabrics may be characterized by an area shrinkage of less than 2%.

IV. Addition of an Alkane Sulfonate

In some embodiments, one or more of the spunbond nonwoven fabric of the fibrous layer, or the meltblown web of the abrasive layer may include at least one alkane sulfonate. It is believed that inclusion of an alkane sulfonate in both the meltblown web and the spunbond nonwoven fabric may help improve bonding between the meltblown fibers and the spunbond fibers. As a result, the cleaning wipe having the alkane sulfonate may exhibit improved integrity during use. In addition to the above discussed advantage, it has also been found that the inclusion of the alkane sulfonate helps to improve the strength and toughness of the spunbond nonwoven fabric.

The at least one alkane sulfonate typically comprises an alkane chain having from $C_{10}$-$C_{18}$, and wherein at least one of the carbons of the alkane chain includes a sulfonate moiety. In a preferred embodiment, the at least one alkane sulfonate comprises a secondary alkane sulfonate. In particular, the at least one alkane sulfonate/secondary alkane sulfonate may comprise a sulfonic acid, C13-C17-secondary alkane, sodium salt.

The alkane chain is generally linear although some chains may include some minor branching (e.g., $C_1$-$C_4$ side chain branching). Typically, the alkane chain will have from 10 to 18 carbon atoms, with an alkane chain length of 14 to 17 carbon atoms being somewhat more preferred. The alkane sulfonate may include both mono- and disulfonic acids. However, the amount of monosulfonic acids in the secondary alkane sulfonate may generally be greater than 90%.

In one embodiment, the at least one alkane sulfonate/secondary alkane sulfonate has one of the following structures:

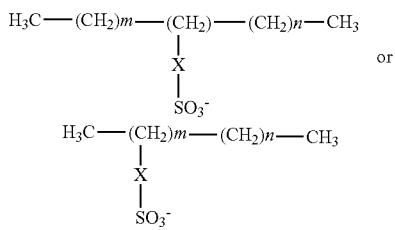

wherein m+n is a number between 7 and 16, and X is independently a $C_1$-$C_4$ alkyl or absent. In a preferred embodiment, the alkane sulfonate/secondary alkane sulfonate has the following structure:

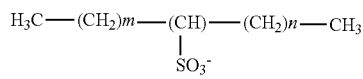

wherein m+n is a number between 8 and 15, and more preferably m+n is a number between 11 and 14. The alkane sulfonate typically comprises a salt of sodium or potassium, but other cations could be used, such as a salt of calcium or magnesium. Alternatively, a quaternary ammonium comprised of modified fatty alkyl substrates such as those based on coco or stearyl substrates could be used. Such quaternary amines are available from Air Products and Chemicals, Inc. of Allentown, Pa. 18195-1501, USA.

In one embodiment, the alkane sulfonate/secondary alkane sulfonate may be provided in a masterbatch carrier resin. For example, in one embodiment, the secondary alkane sulfonate is provided in a PLA polymer carrier resin that is blended with the PLA prior to spinning of the fibers. Typically, the amount of alkane sulfonate, and in particular, a secondary alkane sulfonate, in the PLA masterbatch is from about 5 to 25 weight percent based on the total weight of the masterbatch, with an amount from 10 to 20 weight percent being somewhat more typical. The masterbatch may also include additional additives, such as one or more compatibilizers. A commercial example of a secondary alkane sulfonate that may be used in embodiments of the claimed invention includes SUKANO® under the product name 5546-Q1, which is a C14-C17 secondary alkane sulfonate sodium salt in a PLA masterbatch. One skilled in the art would recognize that design of a masterbatch for a secondary alkane sulfonate is a compromise between maximizing the use of PLA resins with very similar melt flow as observed for the base resin of the fiber, such as, for example, NatureWorks 6202D or 6252 D (Melt Index g/10 minutes (210° C.) 15 -30 or 15, respectively, and the ease of suspending the secondary alkane sulfonate in a PLA polymer. Thus, a suitable masterbatch may be comprised of a PLA grade such as Nature Works 6362D with a higher melt Index (Melt Index g/10 minutes (210° C.) of 70-85.

When present in the meltblown web, the amount of the alkane sulfonate/secondary alkane sulfonate may range from about 0.0125 weight percent to about 3 weight percent, based on the total weight of the meltblown web, and in particular, from about 0.25 to 2.5 weight percent, and more particularly, from about 0.5 to about 3 weight percent, based on the total weight of the meltblown web.

In one embodiment, the fibrous layer comprises a spunbond nonwoven fabric comprising a plurality of fibers that are bonded to each other to form a coherent web, and wherein the plurality fibers comprise a blend of a PLA resin and at least one alkane sulfonate/secondary alkane sulfonate. As explained in greater detail below, the inclusion of an alkane sulfonate in the PLA resin improves the strength and toughness of the fabric in comparison to an identical fabric that does not include the alkane sulfonate.

The amount of the alkane sulfonate/secondary alkane sulfonate in the spunbond fibers will generally depend on where the alkane sulfonate is present in the structure of the fibers, and the final desired properties of the nonwoven fabric. In general, the amount of the alkane sulfonate/secondary alkane sulfonate may range from about 0.0125 weight percent to about 2.5 weight percent, based on the total weight of the polymeric component of the fiber in which the alkane sulfonate is present. For example, in monocomponent fibers the weight percent of the alkane sulfonate/secondary alkane sulfonate in the fibers will be based on the total weight of the fiber. In such a case, the amount of alkane sulfonate may range from about 0.0125 weight percent to about 2.5 weight percent, based on the total weight of the fiber. However, in the case of a bicomponent fiber, the weight percent of the alkane sulfonate/ secondary alkane sulfonate will be based on the total weight of the component in which the alkane sulfonate/secondary alkane sulfonate is present. For example, in the case of a bicomponent fiber in which the alkane sulfonate/secondary alkane sulfonate is only present in the sheath, the weight percent of the secondary alkane sulfonate/secondary alkane sulfonate in the fiber may range from about 0.0125 weight percent to about 2.5 weight percent, based on the total weight of the sheath, which for a bicomponent fabric having a sheath to core weight ratio of 30:70 results in a weight percent of the alkane sulfonate that is from 0.0375 to 0.750, based on the total weight of the fiber.

In one embodiment, the amount of the alkane sulfonate/secondary alkane sulfonate may be at least about any one of the following: at least 0.0125, at least 0.0250, at least 0.0375, at least 0.050, at least 0.0625, at least 0.075, at least 0.100, at least 0.125, at least 0.150, at least 0.1875, at least 0.2, at least 0.2475, at least 0.25, at least 0.3 at least 0.375, at least 0.40, at least 0.495, at least 0.50, at least 0.60, at least 0.80, at least 0.9904, at least 1.0, at least 1.25, at least 1.2375, at least 1.5, at least 1.875, at least 2.0, and at least 2.50, based on the total weight of the polymeric component of the fiber in which the alkane sulfonate/secondary alkane sulfonate is present. In other embodiments, the amount of the alkane sulfonate/secondary alkane sulfonate may be less than about any one of the following: 0.0250, 0.0375, 0.050, 0.0625, 0.075, 0.100, 0.125, 0.150, 0.1875, 0.2, 0.2475, 0.25, 0.3, 0.375, 0.40, 0.495, 0.50, 0.60, 0.80, 0.9904, 1.0, 1.25, 1.2375, 1.5, 1.875, 2.0, and 2.50. It should also be recognized that the amount of the alkane sulfonate/secondary alkane sulfonate present in a polymer component of the fiber also encompasses ranges between the aforementioned amounts.

In a preferred embodiment, the fibers of the spunbond nonwoven fabric have a bicomponent structure in which the core and sheath both comprise a PLA polymer, and the sheath includes the alkane sulfonate/secondary alkane sulfonate that is present in an amount that is from about 0.1 to 1 weight percent, based on the total weight of the sheath component, and in particular, from about 0.1 to 0.75, and more particularly from about 0.2 to 0.6 weight percent, and even more particularly, from about 0.3 to 0.4 weight percent, based on the total weight of the sheath component. Although, the alkane sulfonate/secondary alkane sulfonate has generally discussed as being present in a monocomponent fiber or the sheath of a bicomponent fiber, it should be recognized that other arrangements are within the embodiments of the present invention. For example, the alkane sulfonate/secondary alkane sulfonate may be present in only the core and not the sheath of a bicomponent fiber, or the alkane sulfonate/secondary alkane sulfonate may be present in both the sheath and the core.

As the amount of the alkane sulfonate/secondary alkane sulfonate in the fibers may vary depending on the amount of the alkane sulfonate in the masterbatch polymer, the structure of the fiber (e.g., monocomponent or bicomponent), and in the case of the bicomponent, the ratio of a first polymer component to a second component in the fiber, the following tables provide exemplary ranges of the alkane sulfonate in various fiber structures and at various loadings of the alkane sulfonate in the masterbatch polymer, and at various loadings of the masterbatch in the PLA polymer

TABLE 2A

Amounts of the Secondary Alkane Sulfonate (SAS) in the Sheath of a bicomponent fiber having a sheath to core weight ratio of 50:50 at various SAS and Master Batch (MB) loadings

| Amount of SAS in MB (%) | Amount of SAS in Sheath at an addition of 5% MB to Sheath polymer (%) | Amount of SAS in Sheath at an addition of 10% MB to Sheath polymer (%) | Amount of SAS in Sheath at an addition of 20% MB to Sheath polymer (%) | Amount of SAS in Sheath at an addition of 25% MB to Sheath polymer (%) |
|---|---|---|---|---|
| 0.25% | 0.0125 | 0.025 | 0.050 | 0.0625 |
| 0.50% | 0.025 | 0.050 | 0.100 | 0.125 |
| 0.75% | 0.0375 | 0.075 | 0.150 | 0.1875 |
| 1.0% | 0.050 | 0.100 | 0.200 | 0.250 |
| 2.0% | 0.100 | 0.200 | 0.400 | 0.500 |
| 3.0% | 0.150 | 0.300 | 0.600 | 0.750 |
| 4.0% | 0.200 | 0.400 | 0.800 | 1.000 |
| 4.95% | 0.2475 | 0.495 | 0.9904 | 1.2375 |
| 5.0% | 0.250 | 0.500 | 1.00 | 1.2500 |
| 7.5% | 0.375 | 0.750 | 1.500 | 1.8750 |
| 10.0% | 0.500 | 1.000 | 2.000 | 2.5000 |

TABLE 2B

Amounts of the Secondary Alkane Sulfonate (SAS) in the Fabric comprised of bicomponent fibers having a sheath to core weight ratio of 50:50 at various SAS and Master Batch (MB) loadings

| Amount of SAS in MB (%) | Amount of SAS in Fabric at an addition of 5% MB to Sheath polymer (%) | Amount of SAS in Fabric at an addition of 10% MB to Sheath polymer (%) | Amount of SAS in Fabric at an addition of 20% MB to Sheath polymer (%) | Amount of SAS in Fabric at an addition of 25% MB to Sheath polymer (%) |
|---|---|---|---|---|
| 0.25% | 0.00625 | 0.0125 | 0.025 | 0.03125 |
| 0.50% | 0.01250 | 0.025 | 0.050 | 0.06250 |
| 0.75% | 0.01875 | 0.0375 | 0.075 | 0.09375 |
| 1.0% | 0.02500 | 0.050 | 0.100 | 0.12500 |

TABLE 2B-continued

Amounts of the Secondary Alkane Sulfonate (SAS) in the Fabric comprised of bicomponent fibers having a sheath to core weight ratio of 50:50 at various SAS and Master Batch (MB) loadings

| Amount of SAS in MB (%) | Amount of SAS in Fabric at an addition of 5% MB to Sheath polymer (%) | Amount of SAS in Fabric at an addition of 10% MB to Sheath polymer (%) | Amount of SAS in Fabric at an addition of 20% MB to Sheath polymer (%) | Amount of SAS in Fabric at an addition of 25% MB to Sheath polymer (%) |
|---|---|---|---|---|
| 2.0% | 0.05000 | 0.100 | 0.200 | 0.25000 |
| 3.0% | 0.07500 | 0.150 | 0.300 | 0.37600 |
| 4.0% | 0.10000 | 0.200 | 0.400 | 0.50000 |
| 4.95% | 0.12375 | 0.2475 | 0.495 | 0.61875 |
| 5.0% | 0.12500 | 0.250 | 0.500 | 0.62500 |
| 7.5% | 0.18750 | 0.375 | 0.750 | 0.93750 |
| 10.0% | 0.25000 | 0.500 | 1.000 | 1.25000 |

TABLE 3A

Amounts of the Secondary Alkane Sulfonate (SAS) in Sheath of a bicomponent fiber having a sheath to core weight ratio of 30:70 at various SAS and Master Batch (MB) loadings

| Amount of SAS in MB (%) | Amount of SAS in Sheath at an addition of 5% MB to Sheath polymer (%) | Amount of SAS in Sheath at an addition of 10% MB to Sheath polymer (%) | Amount of SAS in Sheath at an addition of 20% MB to Sheath polymer (%) | Amount of SAS in Sheath at an addition of 25% MB to Sheath polymer (%) |
|---|---|---|---|---|
| 0.25% | 0.0125 | 0.025 | 0.050 | 0.0625 |
| 0.50% | 0.025 | 0.050 | 0.100 | 0.125 |
| 0.75% | 0.0375 | 0.075 | 0.150 | 0.1875 |
| 1.0% | 0.050 | 0.100 | 0.200 | 0.250 |
| 2.0% | 0.100 | 0.200 | 0.400 | 0.500 |
| 3.0% | 0.150 | 0.300 | 0.600 | 0.750 |
| 4.0% | 0.200 | 0.400 | 0.800 | 1.000 |
| 4.95% | 0.2475 | 0.495 | 0.9904 | 1.2375 |
| 5.0% | 0.250 | 0.500 | 1.00 | 1.2500 |
| 7.5% | 0.375 | 0.750 | 1.500 | 1.8750 |
| 10.0% | 0.500 | 1.000 | 2.000 | 2.5000 |

TABLE 3B

Amounts of the Secondary Alkane Sulfonate (SAS) in a Fabric comprising bicomponent fibers having a sheath to core weight ratio of 30:70 at various SAS and Master Batch (MB) loadings

| Amount of SAS in MB (%) | Amount of SAS in Fabric at an addition of 5% MB to Sheath polymer (%) | Amount of SAS in Fabric at an addition of 10% MB to Sheath polymer (%) | Amount of SAS in Fabric at an addition of 20% MB to Sheath polymer (%) | Amount of SAS in Fabric at an addition of 25% MB to Sheath polymer (%) |
|---|---|---|---|---|
| 0.25% | 0.0375 | 0.0750 | 0.1500 | 0.01875 |
| 0.50% | 0.0750 | 0.1500 | 0.3000 | 0.0375 |
| 0.75% | 0.01125 | 0.0225 | 0.4500 | 0.05625 |
| 1.0% | 0.0150 | 0.0300 | 0.0600 | 0.0750 |
| 2.0% | 0.0333 | 0.0667 | 0.1200 | 0.1500 |
| 3.0% | 0.0450 | 0.0900 | 0.1800 | 0.2250 |
| 4.0% | 0.0600 | 0.1200 | 0.2400 | 0.3000 |
| 4.95% | 0.07425 | 0.1485 | 0.2970 | 0.37125 |
| 5.0% | 0.0750 | 0.1500 | 0.3000 | 0.375 |
| 7.5% | 0.1125 | 0.2250 | 0.4500 | 0.5625 |
| 10.0% | 0.1500 | 0.3000 | 0.6000 | 0.7500 |

TABLE 4

Amounts of the Secondary Alkane Sulfonate (SAS) in a Fabric comprising
PLA monocomponent fibers at various SAS and Master Batch (MB) loadings

| Amount of SAS in MB (%) | Amount of SAS in Fabric at an addition of 5% MB to Sheath polymer (%) | Amount of SAS in Fabric at an addition of 10% MB to Sheath polymer (%) | Amount of SAS in Fabric at an addition of 20% MB to Sheath polymer (%) | Amount of SAS in Fabric at an addition of 25% MB to Sheath polymer (%) |
|---|---|---|---|---|
| 0.25% | 0.0125 | 0.025 | 0.050 | 0.0625 |
| 0.50% | 0.025 | 0.050 | 0.100 | 0.125 |
| 0.75% | 0.0375 | 0.075 | 0.150 | 0.1875 |
| 1.0% | 0.050 | 0.100 | 0.200 | 0.250 |
| 2.0% | 0.100 | 0.200 | 0.400 | 0.500 |
| 3.0% | 0.150 | 0.300 | 0.600 | 0.750 |
| 4.0% | 0.200 | 0.400 | 0.800 | 1.000 |
| 4.95% | 0.2475 | 0.495 | 0.9904 | 1.2375 |
| 5.0% | 0.250 | 0.500 | 1.600 | 1.25 |
| 7.5% | 0.375 | 0.750 | 1.500 | 1.875 |
| 10.0% | 0.500 | 1.000 | 2.000 | 2.500 |

Advantageously, addition of the alkane sulfonate/secondary alkane sulfonate in the PLA resin provides significant increases in mechanical properties in comparison to an identical or similarly prepared spunbond nonwoven fabric that does not include the alkane sulfonate/secondary alkane sulfonate. In this regard, spunbond nonwoven fabrics comprising a blend of a PLA resin and a alkane sulfonate/secondary alkane sulfonate may exhibit tensile strengths that are 50% greater in comparison to a similarly prepared nonwoven fabric that does not include the alkane sulfonate/secondary alkane sulfonate. In some embodiments, the nonwoven fabric may exhibit a tensile strength that is from 50% to 200% greater than the tensile strength of a similarly prepared nonwoven fabric that does not include the alkane sulfonate/secondary alkane sulfonate.

In particular, spunbond nonwoven fabrics comprising a blend of a PLA resin and a alkane sulfonate/secondary alkane sulfonate may exhibit increases in machine direction (MD) tensile strengths that are from about 55 to 125% in comparison to a similarly prepared nonwoven fabric that does not include the alkane sulfonate/secondary alkane sulfonate. In some embodiments, such fabrics may exhibit an increase in MD tensile strength ranging from about 50 to 150%, such as from about 55 to 125%, from about 65 to 110%, from about 85 to 110%, or from about 90 to 110%, in comparison to a similarly prepared nonwoven fabric that does not include the alkane sulfonate/secondary alkane sulfonate.

In some embodiments, spunbond nonwoven fabrics comprising a blend of a PLA resin and an alkane sulfonate may exhibit increases in cross direction (CD) tensile strengths that are from about 50 to 200% in comparison to a similarly prepared nonwoven fabric that does not include the alkane sulfonate/secondary alkane sulfonate. In some embodiments, the fabrics may exhibit an increase in CD tensile strength ranging from about 50 to 170%, such as from about 55 to 165%, from about 65 to 160%, from about 85 to 150%, or from about 90 to 125%, in comparison to a similarly prepared nonwoven fabric that does not include the alkane sulfonate/secondary alkane sulfonate.

Spunbond nonwoven fabrics comprising a blend of a PLA resin and an alkane sulfonate/secondary alkane sulfonate also exhibit increased toughness in comparison to a similarly prepared nonwoven fabric that does not include the alkane sulfonate/secondary alkane sulfonate. The toughness of nonwoven fabrics may be compared by examining the product resulting from the multiplication of the observed percent elongation and the observed tensile strength of the fabric. The product of this multiplication is referred to as the Index of Toughness, which is approximately proportional to the area under the stress strain curve. As discussed below in the Test Methods section, all tensile and elongation values are obtained according to German Method 10 DIN 53857 in which a sample having a width of 5 cm and a 100 mm gauge length at a cross-head speed of 200 mm/min were recorded at peak. Since Index of Toughness results from the product of multiplying Tensile X % Elongation, the Index of Toughness has units of (N/5cm)-%. Since all mechanical properties result from testing a 5 cm wide sample, the units for Index of Toughness in this document will be simplified to N-%.

Spunbond nonwoven fabrics comprising a blend of a PLA resin and an alkane sulfonate/secondary alkane sulfonate may exhibit an MD Index of Toughness that is from about 2,000 to 7,500 N-%, and in particular, from about 2,300 to 6,500, and more particularly, from about 2,300 to 6,000 N-%, and a CD Index of Toughness that is from about 1,000 to 5,000 N-%, and in particular, from about 1,250 to 5,000, and more particularly, from about 1,250 to 3,500 N-%.

In one embodiment, the spunbond nonwoven fabric comprising a blend of a PLA resin and an alkane sulfonate/secondary alkane sulfonate may exhibit an increase in MD Index of Toughness that is from 20 to 1,250% in comparison to a similarly prepared nonwoven fabric that does not include the alkane sulfonate/secondary alkane sulfonate. For example, the spunbond nonwoven fabric may exhibit an increase in MD Index of Toughness of any one or more of at least 25%, at least 100%, at least 200%, at least 300%, at least 400%, at least 500%, at least 600%, at least 700%, at least 800%, at least 900%, at least 1,000%, at least 1,050%, at least 1,100%, at least 1,150%, at least 1,200%, at least 1,250%, at least 1,300%, or at least 1,500%, in comparison to a similarly prepared nonwoven fabric that does not include the alkane sulfonate/secondary alkane sulfonate.

In some embodiments, the spunbond nonwoven fabrics comprising a blend of a PLA resin and an alkane sulfonate/secondary alkane sulfonate may exhibit an increase in CD Index of Toughness that is from about 50 to 1,000% in comparison to a similarly prepared nonwoven fabric that does not include the secondary alkane sulfonate. For example, spunbond nonwoven fabrics comprising a blend of a PLA resin and an alkane sulfonate/secondary alkane sulfonate may exhibit an increase in CD Index of Toughness of any one or more of at least 60%, at least 75%, at least 80%, at least 85%, at least 90%, at least 100%, at least 150%, at least 200%, at least 250%, at least 300%, at least 350%, at least 400%, at least 500%, at least 550%, at least 600%, at least 700%, at least 800%, at least 900%, at least 1,000%, or at least 1,025%, in comparison to a similarly prepared nonwoven fabric that does not include the alkane sulfonate/secondary alkane sulfonate.

To account for variations in basis weights, it may also be useful to consider Relative Index of Toughness for the spunbond nonwoven fabrics comprising a blend of a PLA resin and a alkane sulfonate/secondary alkane sulfonate in comparison to similarly prepared nonwoven fabrics that do not include the alkane sulfonate/secondary alkane sulfonate. The spunbond nonwoven fabrics comprising a blend of a PLA resin and an alkane sulfonate/secondary alkane sulfonate also exhibited significant increases in toughness in comparison to the nonwoven fabrics of the comparative examples. The Relative Index of Toughness is calculated from the Index of Toughness, which is then normalized for basis weight. The Toughness Index can be divided by basis weight to provide a normalized Index of Toughness with units of N-%/g/m$^2$.

Spunbond nonwoven fabrics comprising a blend of a PLA resin and an alkane sulfonate/secondary alkane sulfonate may exhibit an MD Relative Index of Toughness that is from about 50 to 150 N-%/g/m$^2$, and in particular, from about 75 to 125, and more particularly, from about 85 to 115 N-%/g/m$^2$, and a CD Relative Index of Toughness that is from about 40 to 100 N-%/g/m$^2$, and in particular, from about 45 to 85, and more particularly, from about 45 to 75 N-%/g/m$^2$.

In one embodiment, the spunbond nonwoven fabrics comprising a blend of a PLA resin and an alkane sulfonate/secondary alkane sulfonate may exhibit an increase in MD Relative Index of Toughness that is from 100 to 1000% in comparison to a similarly prepared nonwoven fabric that does not include the alkane sulfonate/secondary alkane sulfonate. In a preferred embodiment, the inventive nonwoven fabric may exhibit an increase in MD Relative Index of Toughness that is from about 80 to 500%, and more preferably, from about 140 to 480% in comparison to a similarly prepared nonwoven fabric that does not include the alkane sulfonate/secondary alkane sulfonate. For example, the inventive nonwoven fabric may exhibit an increase in MD Relative Index of Toughness of any one or more of at least 100%, at least 125%, at least 150%, at least 175%, at least 200%, at least 225%, at least 250%, at least 275%, at least 300%, at least 325%, at least 350%, at least 375%, at least 400%, at least 425%, at least 450%, at least 475%, at least 500%, at least 525%, at least 550%, at least 575%, at least 600%, at least 625%, at least 650%, at 675%, at least 700%, at least 725%, at least 750%, at least 775%, at least 800%, at least 825%, at least 850%, at least 875%, at least 900%, at least 925%, at least 950, at least 975%, or at least 1,000%, in comparison to a similarly prepared nonwoven fabric that does not include the alkane sulfonate/secondary alkane sulfonate.

In one embodiment, the spunbond nonwoven fabric may exhibit an increase in CD Relative Index of Toughness that is from 100 to 1000% in comparison to a similarly prepared nonwoven fabric that does not include the alkane sulfonate/secondary alkane sulfonate. In a preferred embodiment, the spunbond nonwoven fabrics comprising a blend of a PLA resin and a secondary alkane sulfonate may exhibit an increase in CD Relative Index of Toughness that is from about 140 to 500%, and more preferably, from about 140 to 410% in comparison to a similarly prepared nonwoven fabric that does not include the alkane sulfonate/secondary alkane sulfonate. For example, the spunbond nonwoven fabric may exhibit an increase in MD Relative Index of Toughness of any one or more of at least 100%, at least 125%, at least 150%, at least 175%, at least 200%, at least 225%, at least 250%, at least 275%, at least 300%, at least 325%, at least 350%, at least 375%, at least 400%, at least 425%, at least 450%, at least 475%, at least 500%, at least 525%, at least 550%, at least 575%, at least 600%, at least 625%, at least 650%, at 675%, at least 700%, at least 725%, at least 750%, at least 775%, at least 800%, at least 825%, at least 850%, at least 875%, at least 900%, at least 925%, at least 950, at least 975%, or at least 1,000%, in comparison to a similarly prepared nonwoven fabric that does not include the alkane sulfonate/secondary alkane sulfonate.

When comparing properties of different nonwovens it is often useful to compare the root mean square of the combined values of the MD and CD property of interest. This method allows comparison of single values. The root mean square provides a single number that combines input from both the MD and the CD values by taking the square root of the sum of the square of the MD value plus the square of the CD value. Use of the root mean square method to combine the MD and the CD results is particularly useful if samples to be compared were made on different machines or under some different condition that might influence the MD/CD ratio. The root mean square of the Toughness Index per basis weight is calculated with the following formula:

$$\left(\sqrt{\frac{(MDTI)^2 + (CDTI)^2}{2}}\right) / \text{Basis weight}$$

Where MDTI is the machine direction Toughness Index and CDTI is the cross direction Toughness Index.

Spunbond nonwoven fabrics comprising a blend of a PLA resin and an alkane sulfonate/secondary alkane sulfonate may have a root mean square of the Toughness Index per basis weight that is at least 55 N-%/g/m$^2$, and more preferably, at least 65 N-%/g/m$^2$, and even more preferably at least 70 N-%/g/m$^2$. In one embodiment, the spunbond nonwoven fabric has a root mean square of the Toughness Index per basis weight has a value from about 55 to 250 N-%/g/m$^2$, and in particular, from about 65 to 150 N-%/g/m$^2$, and more particularly, from about 65 to 100 N-%/g/m$^2$. In one embodiment, the spunbond nonwoven fabric has a root mean square of the Toughness Index per basis weight of at least 75, at least 80, at least 85, at least 90, at least 95, at least 100, at least 105, at least 110, at least 115, at least, 120, at least 125, at least, 130, at least 135, at least 140, at least 145, at least 150, at least 155, at least 160, at least 165, at least 170, at least 175, at least 180, at least 185, at least 190, at least 195, and at least 200 N-%/g/m$^2$.

By "similarly prepared nonwoven fabric" it should be understood the comparison nonwoven fabric has the identical polymer composition with the exception of the secondary alkane sulfonate, and that slight variations in processing conditions, such as temperature (e.g., extruder, calendaring, and die temperatures), draw speeds, and pressures may exist.

IV. Process of Making the Cleaning Wipe

Cleaning wipes in accordance with the invention may be prepared in a wide variety of ways. In one embodiment, the wipe may be prepared in a one-step continuous in-line process in which the fibrous layer is first formed by depositing a plurality of continuous filaments onto a collection surface to form a web, which is then followed by depositing a plurality of meltblown fibers onto the surface of the previously formed web to form a composite web having an abrasive layer and a fibrous layer. Thereafter, the composite web may be subjected to a bonding step. The resulting composite web may then be processed to form individual cleaning wipes.

Alternatively, the cleaning wipe may be prepared in a two-step process in which a fibrous layer is separately made in a first step, and then in a second step meltblown fibers are deposited on the surface of the fibrous layer to form a meltblown web defining the abrasive layer. As discussed below, the meltblown fibers are generally deposited onto the fibrous layer in a molten or semi-molten state which then allows them to bond to the fibers of the fibrous layer as they cool and solidify.

In a preferred embodiment, the fibrous layer comprises a spunbond nonwoven fabric comprising filaments having a high sustainable polymer content, such a PLA resin. For example, in embodiments in which the sustainable polymer component comprises PLA, the process may include providing a stream of molten or semi-molten PLA resin, forming a plurality of drawn PLA continuous filaments, depositing the plurality of PLA continuous filaments onto a collection surface, exposing the plurality of PLA continuous filaments to ions, and bonding the plurality of PLA continuous filaments to form the PLA spunbond nonwoven fabric. According to certain embodiments, for example, forming the plurality of PLA continuous filaments may comprise spinning the plurality of PLA continuous filaments, drawing the plurality of PLA continuous filaments, and randomizing the plurality of PLA continuous filaments.

In this regard, the spunbond nonwoven fabric may be produced, for example, by the conventional spunbond process on spunbond machinery such as, for example, the Reicofil-3 line or Reicofil-4 line from Reifenhauser, as described in U.S. Pat. No. 5,814,349 to Geus et al, the entire contents of which are incorporated herein by reference, wherein molten polymer is extruded into continuous filaments which are subsequently quenched, attenuated pneumatically by a high velocity fluid, and collected in random arrangement on a collecting surface. In some embodiments, the continuous filaments are collected with the aid of a vacuum source positioned below the collection surface. After filament collection, any thermal, chemical or mechanical (e.g., needling or hydroentanglement) bonding treatment may be used to form a bonded web such that a coherent web structure results. As one skilled in the art will understand, examples of thermal bonding may include thru-air bonding where hot air is forced through the web to soften the polymer on the outside of certain fibers in the web followed by at least limited compression of the web or calender bonding where the web is compressed between two rolls, at least one of which is heated, and typically one is an embossed roll. In a preferred embodiment, bonding of the web occurs following the step of depositing the meltblown fibers onto the surface of the spunbond nonwoven fabric.

Figure 2:
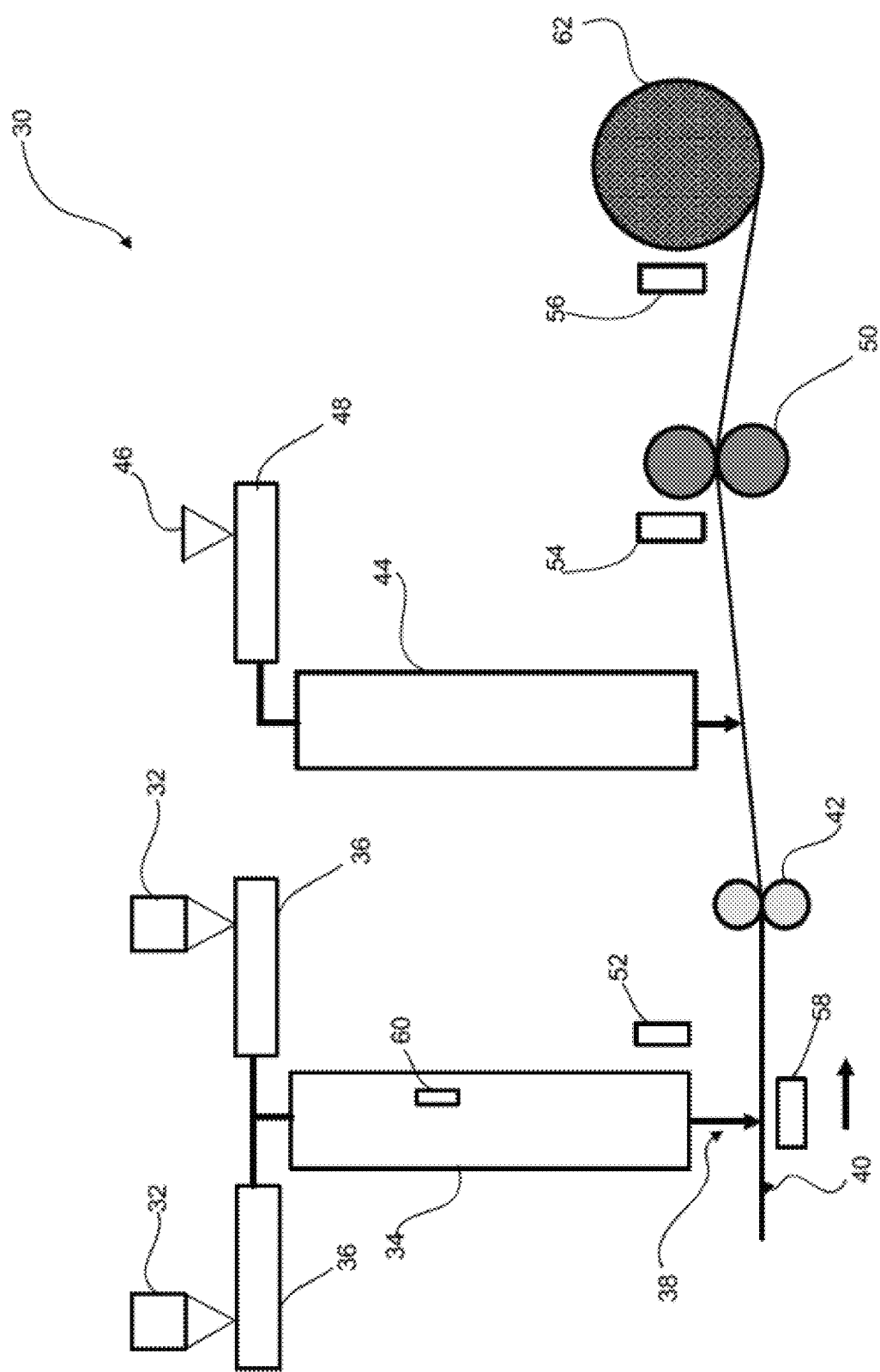
FIG. 2 is a schematic diagram of the PLA cleaning wipe preparation system in accordance with certain embodiments of the invention.

With reference to FIG. 2, for example, a schematic diagram of a system for preparing the cleaning wipe that is in accordance with certain embodiments of the invention is illustrated and designated by reference character 30.

As shown in FIG. 2, a sustainable polymer resin source (i.e., a hopper) 32 is in fluid communication with a spunbond spin beam 34 via an extruder 36. The sustainable polymer resin is heated in the extruder 36 to provide a molten or semi-molten polymer stream that is introduced into a spunbond spin beam 34. It should be noted that a secondary alkane sulfonate may optionally be introduced directly into the extruder or may be introduced into the sustainable polymer resin source (e.g., the hopper) prior to the sustainable polymer resin being introduced into the extruder.

Although FIG. 2 illustrates an embodiment having two sustainable polymer resin sources 32 and two extruders 36, the system may include any number of polymer sources (e.g., PLA, synthetic polymer, such as polypropylene, polyethylene, etc.) and extruders as dictated by a particular application as understood by one of ordinary skill in the art. Following extrusion, the extruded polymer may then enter a plurality of spinnerets (not shown) for spinning into filaments. Following spinning, the spun filaments may then be drawn (i.e. attenuated) via a drawing unit (not shown) and randomized in a diffuser. The spin beam 34 produces a curtain of filaments that is deposited on the collection surface 40 at point 38.

In some embodiments, for instance, the collection surface may comprise conductive fibers. The conductive fibers may comprise monofilament wires made from polyethersulfone conditioned with polyamide (e.g., Huycon—LX 135). In the machine direction, the fibers comprise polyamide conditioned polyethersulfone. In the cross-machine direction, the fibers comprise polyamide conditioned polyethersulfone in combination with additional polyethersulfone. Examples of suitable collection surfaces are available from Albany, Nipon, AstenJohnson, and Xerium.

In some embodiments, a pair of cooperating rolls 42 (also referred to herein as a "press roll") stabilize the web of the continuous filaments by compressing the web before delivery to the calender 50 for bonding. In some embodiments, for example, the press roll may include a ceramic coating deposited on a surface thereof. In certain embodiments, for instance, one roll of the pair of cooperating rolls 42 may be positioned above the collection surface 40, and a second roll of the pair of cooperating rolls 42 may be positioned below the collection surface 40.

A meltblown spin beam 44 is positioned downstream of the spunbond spin beam and is configured to deposit a layer of meltblown fibers onto the surface of the spunbond nonwoven fabric. A sustainable polymer resin source (i.e. hopper) 46 is in fluid communication with the meltblown spin beam 44 via the extruder 48. As discussed above, the meltblown process conditions are selected so as to provide a meltblown web having a desired abrasiveness depending on the intended application of the resulting cleaning wipe. For example, a cleaning wipe having an increased coarseness may be produced by selecting meltblown process conditions that result in a higher degree abrasive structures being formed on the meltblown web, for example, of shot being produced and/or a higher degree of conglomeration of adjacent meltblown fibers.

Upon deposition of the meltblown fibers onto surface of the spunbond nonwoven fabric, the "hot" meltblown fibers will still be in a molten or semi-molten state, which facilitates bonding (e.g, "self-bonding") of the meltblown fibers to each other and to the fibers of the spundbond nonwoven fabric to form a composite web. The resulting bonds provide integrity and strength to the resulting composite web.

In addition the composite web of meltblown and spunbond fibers may be further strengthened by calender bonding the structure together. For example in FIG. 2 the system 30 includes a calender roll 50 comprising a cooperating smooth roll and embossed roll. Significant care must be used in such a calender bonding operation to select the bonding pattern, the bonding temperatures of the two rolls, the bonding pressure for the pair of rolls and proper static control for the composite web to achieve the desired structural integrative of the composite web, while preserving the open, abrasive surface of the meltblown web, and managing the natural propensity for the meltblown web surface to wrap the calender roll/rolls. To further prevent roll wrapping the coated roll surface may be treated with an anti-stick release coating as taught in European Patent No 1,432,860.

Following bonding, the composite web may then be moved to a winder 62, where the composite web is wound onto rolls. The composite web may then be further processed to prepare cleaning wipes in accordance with embodiments of the invention.

During the course of their investigation, the inventors have discovered that static generation during fiber spinning and web processing when a sustainable polymer, such as PLA, is exposed on the fiber surface promotes web wraps at the press rolls and calender of the spunbond system. This web wrap is undesirable and generally has prevented the high speed production of fabrics comprising a high content of sustainable polymer (e.g., PLA), or fabrics in which the sustainable polymer is exposed at the surface of the fibers. One method of addressing web wrap is by increasing the humidity of the spunbond process by, for example, injecting steam into the air stream used to quench the just-spun fibers or providing a fine mist or fog of moisture around the press rolls where the spun fibers are first formed into an unbonded web. Although the extra humidity provides some protection from web wraps, the addition of high moisture over a period of time may promote corrosion of the spunbond equipment and growth of mold or microorganisms detrimental to nonwoven use in hygiene and medical operations.

To address the issue of static generation, the process may further comprise dissipating static charge from the spunbond nonwoven fabric proximate to one or more of the collection surface, press rolls, calender roll, or the like via a static control unit. In some embodiments, for example, the static control unit may comprise an ionization source. In further embodiments, for instance, the ionization source may comprise an ionization bar. However, in other embodiments, for example, dissipating static charge from the spunbond nonwoven fabric may comprise contacting the spunbond nonwoven fabric with a static bar.

Advantageously, the inventors have discovered that fabrics comprising high sustainable polymer content, such as a high PLA content, may be prepared at commercially viable processing speeds by positioning one or more ionization sources in close proximity to the spunbond nonwoven fabric. For example, in one embodiment, an ionization source 52 may be positioned near the spin beam 34 and an ionization source 56 may be positioned near the winder 62 to actively dissipate/neutralize static charge without contacting the fabric. As explained below, the ionization source exposes the spunbond nonwoven fabric to a stream of ions, which act to neutralize static charges in the nonwoven fabric. The stream of ions may include positive ions, negative ions, and combinations thereof.

In some embodiments, it may also be desirable to position a static control unit 54 downstream of the outlet of the meltblown spin beam 44. In the illustrated embodiment, the static control unit is depicted as being positioned near the calender 50. The static control unit 54 may be passive static bar requiring contact with the fabric or an active ionization bar, which does not require contact with the fabric. Finally, an optional humidity unit 60 may be used in conjunction with the spin beam 34 and/or the press roll 42 to reduce static via added moisture.

In accordance with certain embodiments, for example, the first ionization source may be positioned above the collection surface and downstream of a point at where the continuous filaments are deposited on the collection surface. However, in other embodiments, for instance, the first ionization source may be positioned between the outlet of the spin beam and the collection surface.

As discussed previously, the system may further comprise a press roll positioned downstream from the outlet of the spin beam. In this regard, the press roll may be configured to stabilize the web of the continuous filaments by compressing said web before delivery of the continuous fibers from the outlet of the spin beam towards the calender. In those embodiments including the press roll, for example, the first ionization source may be positioned downstream from the press roll. In other embodiments, for instance, the first ionization source may be positioned between the spin beam and the press roll.

In some embodiments and as shown in FIG. 2, the system may comprise a vacuum source 58 disposed below the collection surface for pulling the plurality of continuous filaments from the outlet of the spin beam onto the collection surface before delivery to the calender.

Figure 3C:
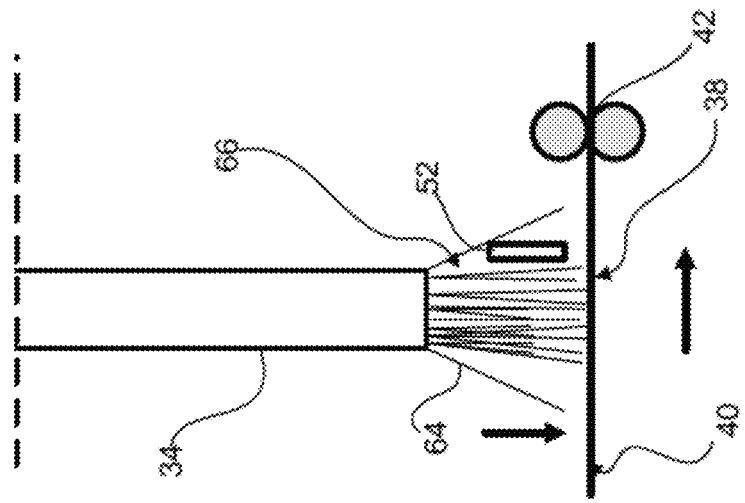
FIGS. 3A-3C are schematic diagrams illustrating positioning of a first ionization source in accordance with certain embodiments of the invention.
Figure 3B:
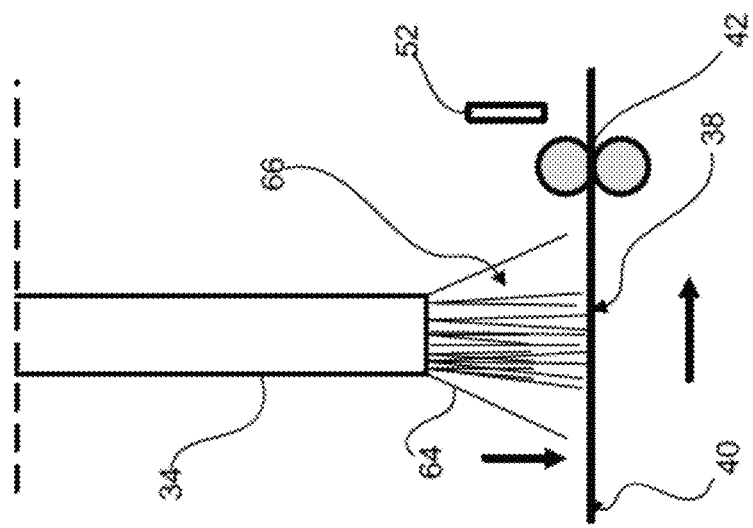
Figure 3A:
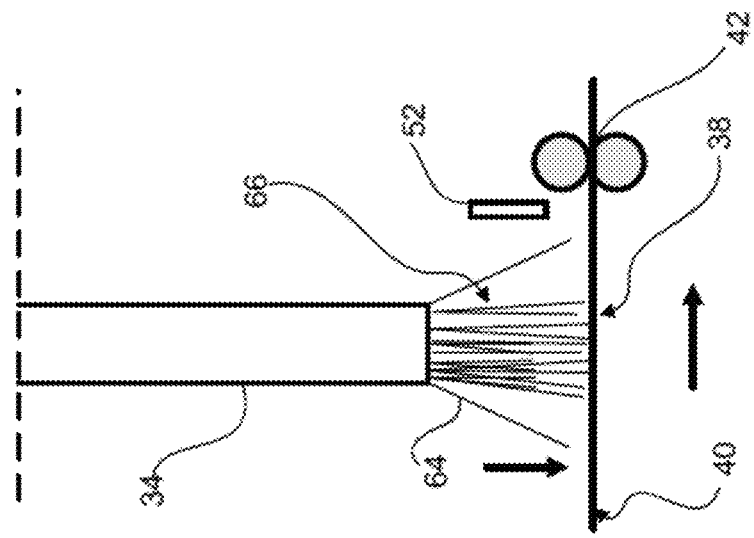

FIGS. 3A-3C, for example, are schematic diagrams illustrating positioning of the first ionization source in accordance with certain embodiments of the invention. As shown in FIG. 3A, the first ionization source 52 is positioned downstream of the outlet (i.e. diffuser) 64 of the spin beam 34 but upstream of the press roll 42. In FIG. 4B, however, the first ionization source 52 is positioned downstream of the press roll 42. In FIG. 2C, the first ionization source is positioned downstream of the point 38 at which the curtain of filaments 66 are deposited on the collection surface but also within the outlet of the diffuser.

Preferably, the ionization source comprises a device that is capable of actively discharging ions with the use of electrodes, ionizing air nozzles, ionizing air blowers, and the like. In one embodiment, the ionization source comprises an active discharge ionization bar that actively discharges ions in the direction of the nonwoven fabric. Examples of suitable ionization bars may include Elektrostatik Discharging Electrode E3412, which is available from Iontis.

In one embodiment, the ionization bar may extend over the web in the cross direction. Preferably, the ionization bar extends in the cross direction across the total width of the nonwoven fabric. In further embodiments, the ionization bar may extend under the web and the collection surface in the cross direction. However, positioning the ionization bar under the collection surface may be less effective than positioning the ionization bar over the web in the cross direction.

According to certain embodiments, for example, the first ionization source and the collection surface may be separated by a distance from about 1 inch to about 24 inches. In other embodiments, for instance, the first ionization source and the collection surface may be separated by a distance from about 1 inch to about 12 inches. In further embodiments, for example, the first ionization source and the collection surface may be separated by a distance from about 1 inch to about 5 inches. As such, in certain embodiments, the first ionization source and the collection surface may be separated by a distance from at least about any of the following: 1, 1.25, 1.5, 1.75, and 2 inches and/or at most about 24, 20, 16, 12, 10, 9, 8, 7, 6, and 5 inches (e.g., about 1.5-10 inches, about 2-8 inches, etc.).

In accordance with certain embodiments, for instance, the system may further comprise a static control unit positioned and arranged to dissipate static from the spunbond nonwoven fabric proximate to the calender. In some embodiments, for example, the static control unit may be positioned upstream from, and adjacent to, the calender. In other embodiments, however, the static control unit may be positioned downstream from, and adjacent to, the calender.

In some embodiments, for instance, the static control unit may comprise a passive static bar. In such embodiments, the static control unit may contact the spunbond nonwoven fabric in order to dissipate static charge. In other embodiments, however, the static control unit may comprise a second ionization source. As such, the second ionization source may actively dissipate static charge from the spunbond nonwoven fabric such that contact by the second ionization source with the spunbond nonwoven fabric is not required in order to dissipate the static charge.

In accordance with certain embodiments, for instance, the process may further comprise increasing humidity while forming the plurality of continuous filaments. In such embodiments, for example, increasing humidity may comprise applying at least one of steam, fog, mist, or any combination thereof to the plurality of continuous filaments.

According to certain embodiments, for example, the system may further comprise a winder 62 positioned downstream from the calender. In such embodiments, for instance, the system may also include a third ionization source positioned and arranged to expose the PLA spunbond nonwoven fabric to ions proximate to the winder. In some embodiments, for example, at least one of the first ionization source, the static control source (e.g., the second ionization source), and the third ionization source may comprise an ionization bar. In this regard, for instance, the first ionization source, the static control source, and the third ionization source may be configured to actively dissipate static charge created during preparation of the PLA spunbond nonwoven fabric.

In accordance with certain embodiments, for instance, bonding of the composite web may comprise thermal point bonding the structure with heat and pressure via a calender having a pair of cooperating rolls including a patterned roll. In such embodiments, for example, thermal point bonding the structure may comprise imparting a three-dimensional geometric bonding pattern onto the composite web. In some embodiments, for instance, imparting the bonding pattern onto the composite web may comprise imparting at least one of a diamond pattern, a hexagonal dot pattern, an oval-elliptic pattern, a rod-shaped pattern, or any combination thereof.

In bonding the composite web, it is desirable to maintain abrasive structures and any void volume (e.g., unevenness, irregularities in the surface, and the like) within the meltblown web during the bonding process in order to maintain the abrasiveness of the surface. Accordingly, in some embodiments, it may be desirable to arrange the calender such that the meltblown surface of the composite web is arranged facing the patterned roll, and the spunbond nonwoven fabric surface is arranged facing the anvil roll. In addition, it is believed that lightly bonding the composite web helps to retain abrasiveness of the meltblown web during bonding.

In certain embodiments, for example, the bonding pattern may cover from about 5% to about 30% of the surface area of the patterned roll. In other embodiments, for instance, the bonding pattern may cover from about 10% to about 25% of the surface area of the patterned roll. As such, in certain embodiments, the bonding pattern may cover from at least about any of the following: 5, 6, 7, 8, 9, and 10% and/or at most about 30, 29, 28, 27, 26, and 25% (e.g., about 8-27%, about 10-30%, etc.). By way of example only, the bonding pattern may comprise the diamond pattern, and the bonding pattern may cover about 10% to 25% of the surface area of the patterned roll. In further embodiments, for instance, the bonding pattern may comprise the oval-elliptic pattern, and the bonding pattern may cover about 10% to 18% of the surface area of the patterned roll. In preferred embodiments, the bonding pattern may cover from about 10% to 15% of the surface area of the patterned roll.

In some embodiments, for example, the calender may comprise a release coating. As understood by one of ordinary skill in the art, the nonwoven strength resulting from calendar bonding is a complex function of the % area covered by the bond, temperature of the calender rolls, compression pressure of the rolls against the composite structure, and the speed of the web through the calendar.

In some emodiments, the composite web may be "self-bonded." In self-bonding, the meltblown fibers are in a molten or semi-molten state. As they are deposited onto the fibrous layer, these "hot" meltblown fibers bond to each other and the fibers of the fibrous layer. In some embodiments, the composite web having the self-bonded meltblown web is not subject to a further bonding step. In other embodiments, the composite web having the self-bonded meltblown web may be subjected to an additional bonding step, such as thermal calender bonding as described previously.

In accordance with certain embodiments, for instance, the spunbond process may occur at a fiber draw speed greater than about 2500 m/min. In other embodiments, for example, the process may occur at a fiber draw speed from about 3000 m/min to about 4000 m/min. In further embodiments, for instance, the process may occur at a fiber draw speed from about 3000 m/min to about 5500 m/min. As such, in certain embodiments, the process may occur at a fiber draw speed from at least about any of the following: 2501, 2550, 2600, 2650, 2700, 2750, 2800, 2850, 2900, 2950, and 3000 m/min and/or at most about 5500, 4000, 3950, 3900, 3850, 3800, 3750, 3700, 3650, 3600, 3550, and 3500 m/min (e.g., about 2700-3800 m/min, about 3000-3700 m/min, etc.).

In a preferred embodiment, the foregoing discussed system is configured to prepare a composite web comprising a fibrous layer comprising a spunbond nonwoven fabric comprising continuous filaments having a high PLA content, and an abrasive layer comprising meltblown fibers having a high PLA content. Preferably, the composite web has a PLA content that is at least 50% by weight, based on the total weight of the structure, and in particular, at least 70%, at least 75%, at least 80%, at least 85%, at least 90, and at least 95%. In a particularly preferred embodiment, the composite web has a 100% PLA content.

Certain embodiments according to the invention provide systems for preparing a cleaning wipe comprising a PLA spunbond nonwoven fabric and a PLA meltblown web. In this regard, the system may include a first PLA source configured to provide a stream of molten or semi-molten PLA resin, a spunbond spin beam in fluid communication with the first PLA source, a collection surface disposed below an outlet of the spin beam onto which PLA continuous filaments are deposited to form the PLA spunbond nonwoven fabric, a first ionization source positioned and arranged to expose the PLA continuous filaments to ions, a second PLA source, a meltblown spin beam in fluid communication with the second PLA source and configured to deposit a web of meltblown PLA fibers onto the PLA spunbond nonwoven fabric, and a calender positioned downstream of the first ionization source.

In accordance with certain embodiments, for example, the system may further comprise a humidity unit positioned within or downstream from the spin beam. In such embodiments, for instance, the humidity unit may comprise at least one of a steam unit, a fogging unit, a misting unit, or any combination thereof. In this regard, for example, humidity may be added in the spin beam during the formation of the plurality of PLA continuous filaments and/or near the press roll(s) (in those embodiments utilizing at least one press roll) in order to provide additional management of static charge that develops during the production of the PLA spunbond nonwoven fabric.

The cleaning wipes may be used in a wide variety of different cleaning applications including cleaning, disinfecting, or treating a surface such as dishes, surfaces for preparing food, cooking surfaces, the floor, and surfaces in the bathroom. In some embodiments, it may be desirable to use the cleaning wipe with a cleaning composition, such as liquid cleaning composition. In this regard, the cleaning wipe may be provided in a packaged form in which the cleaning wipe is impregnated with a cleaning composition. In other embodiments, the cleaning composition may be added by the end user. Non-limiting examples of formulations that may be used with the cleaning wipes are taught by Truong et al in U.S. 2015/0373970 Antimicrobial Compositions, Wipes, and Methods as well as by Chen et al. in U.S. 2005/0136772, the contents of both which are hereby incorporated by reference.

The basis of the cleaning wipe may be selected based on the desired end use of the cleaning wipe. In one embodiment, the cleaning wipe may have a basis weight ranging from about 15 grams per square meter (GSM) to 100 GSM. For other applications, a preferred range may be from about 20 GSM to 80 GSM, and in still other embodiments, the cleaning wipe may have a basis weight ranging from about 30 GSM to 60 GSM. Finally in other embodiments, a basis weight from 25 GSM to 50 GSM may be preferred.

The ratio of the meltblown layer to the spunbond layer may also depend on the final application such as a need for scrubbing, volume to hold or contain a cleaning formulation, and ultimate wipes strength. Thus a ratio of 20/80 to 40/60 meltblown web to spunbond nonwoven fabric may be preferred when strength is of particular importance. On the other hand, if scrubbing or volume to hold a cleaning formulation is more important, a ratio of 40/60 to 60/40 meltblown web to spunbond nonwoven fabric may be preferred.

Thus both the total basis weight and the ratio of the layer meltblown web to the spunbond nonwoven fabric can be tailored to meet the final needs of the consumer.

EXAMPLES

The following examples are provided for illustrating one or more embodiments of the present invention and should not be construed as limiting the invention.

The fabrics in the following examples were prepared on a line equipped with a Reifenhaeuser Reicofil-3 spunbond spin beam, an Accuweb meltblown spin beam, and a Reifenhaeuser Reicofil-4 spunbond spin beam. Each of the examples were prepared using the setup described in Example 1 unless otherwise indicated. Moreover, unless otherwise indicated all percentages are weight percentages. The materials used in the examples are identified below.

Test Methods

Titer was calculated from microscopic measurement of fiber diameter and known polymer density per German textile method C-1570.

Basis Weight was determined generally following the German textile method CM-130 from the weight of 10 layers of fabric cut into 10×10 cm squares.

Tensile was determined in accordance with Method 10 DIN 53857 using a sample with 5 cm width, 100 mm gauge length, and cross-head speed of 200 mm/min. Tensile strengths were measured at peak.

Elongation was determined in accordance with Method 10 DIN 53857 using a sample with 5 cm width, 100 mm gauge length, and cross-head speed of 200 mm/min. Elongations were measured at peak.

Fabric Shrinkage was determined by cutting three samples taken across the web width of nominal dimensions of MD of 29.7 cm and CD of 21.0 cm; measuring the actual MD and CD width at three locations in the sheet; placing the sample in water heated to 60 C for 1 minute; and remeasuring the MD and CD dimensions at the above three locations. The average width measurement after exposure divided by the original measurement X 100% yielded the % Shrinkage. A low % shrinkage value suggests that the continuous fibers comprising PLA have been spun and drawn at sufficient speed to yield after bonding a high strength stable fabric.

Kinetic Coefficient of Friction was measured according to Method C-1231 Coefficient of Friction. In this method the force is measured to move a sled whose base is covered by fabric with fiber side of interest downward against the specified surface. Testing details include Load cell at 100N, Clamps Distance at 138.5 mm and Crosshead Speed=200 mm/minute. The results below in Table XYZ are the average of the results from three tests.

Bending Length was measured according to Test C-1381 Bending Length with Sample Width at 25.0 mm, Sample Length at 250.0 mm, and waiting time=8+/−2 seconds. In this test a specified fabric samples is moved horizontally until the tip of the fabric bends downward to contact a specified surface. Soft drapeable fabrics show a low Bending Length while stiff fabrics resist bending so have a high Bending Length.

Handle-O-Meter Stiffness was measured according to CM-490 Handle-O-Meter. This test measures the force needed to force the specified nonwoven web thought a slot. Thus H-O-M provides a value that combines frictional and bending properties.

In the following examples, the cleaning wipes were prepared in a two-step process in which a spunbond nonwoven fabric comprising 100% PLA fibers was made and then calender bonded. In a second step, 100% PLA meltblown fibers were deposited onto the surface of the spunbond nonwoven fabric.

The spunbond nonwoven fabric was comprised of 100% PLA bicomponent fibers prepared on a pilot line equipped with a Reicofil-4 spinning beam. A press roll (R-4 press roll) was positioned on the collection surface downstream of where the filaments are deposited on the collection surface. An Ionis Elektrostatik Discharging Electrode E3412 (i.e. ionization bar) was positioned above and extending over the collection surface in the cross direction and placed approximately 1 to 3 inches above the collection surface and 2 to 3 inches downstream of the R-4 press roll.

The spunbond nonwoven fabric was comprised of bicomponent 30/70 NatureWorks Grade 6752/NatureWorks Grade 6202/sheath/core fibers made with ionization bars positioned as discussed above to minimize static. The fabric was produced at spin beam temperatures of 235° C. at the extruder and 240° C. at the die. The spunbond fabric was produced using a fiber draw speed of 3,800 m/min and a line speed of 90 m/min. The calender used for bonding the spunbond fabric had a calender temperature of 160° C. for the pattern roll and 147° C. for the anvil roll and a calender pressure of 40 N/mm. The properties of the spunbond nonwoven fabric are summarized in the table below.

TABLE 5

Properties of PLA Spunbond Fabric

| Example | Titer | Basis Weight | MD Tensile | MD Tensile per Basis Weight | CD Tensile | CD Tensile per Basis Weight | MD % Elong. | CD % Elong. | MD Toughness Index | CD Toughness Index |
|---|---|---|---|---|---|---|---|---|---|---|
| Units | DTEX | g/m$^2$ | N/5 cm | N-m$^2$/g-5 cm | N/5 cm | N-m$^2$/g-5 cm | % | % | N-% | N-% |
| PLA Spunbond | 1.7 | 39.8 | 70.7 | 1.78 | 26.6 | 0.668 | 14.7 | 28.61 | 1881 | 761 |

*Calculated basis weight for sample

TABLE 6

Shrinkage Resistance for PLA Spunbond Fabric

| Example | Shrink (MD) % | Shrink (CD) % | Area Shrink % |
|---|---|---|---|
| PLA Spunbond Example | 3.1 | −1.4 | 1.8 |

In a next step, a web of 100% PLA meltblown fibers (NatureWorks Grade 6252 D PLA resin) were deposited onto the previously prepared PLA spunbond nonwoven fabric to produce a composite web. Bonding between the meltblown fibers and the spunbond nonwoven fabric occurred as the meltblown fibers cooled and solidified. The composite web of Samples 1-10 were not subject to a further bonding step, such as calender bonding. The meltblowing process was operated with extruder temperature at 250° C., an Adapter Zone temperature at 250° C., and a temperature at the die of 250° C. The air to the meltblown process was supplied at 270° C. and maintained between approximately 242-252° C. with hot air volume maintained 520 m³/hour. Table 7, below, process key process conditions maintained during production of selected finished wipes. Basis weight of the finished roll was controlled during trial production by balancing meltblown thru-put with the speed of the spunbond web under the meltblown beam.

TABLE 7

PLA Melt Blown Process

| Sample No. | Relative Thru-put (RPM) | Process Air (m³/hr) | DCD (relative mm above the wire) | Suction Blower (RPM) | Calculated Meltblown Basis Weight (GSM) | Addition of Sukano Additive S546-Q1 (%) |
|---|---|---|---|---|---|---|
| Sample 1 69-02 | 24 | 500 | 280 | 800 | 10.7 | 0.5 |
| Sample 2 69-03 | 24 | 1000 | 180 | 1200 | 10.7 | 0.5 |
| Sample 3 69-04 | 24 | 1000 | 180 | 1200 | 10.7 | 0 |
| Sample 4 69-05 | 24 | 500 | 280 | 800 | 10.7 | 0 |
| Sample 5 69-06 | 24 | 200 | 360 | 800 | 10.7 | 0 |
| Sample 6 69-07 | 20 | 200 | 360 | 800 | 14.3 | 0 |
| Sample 7 69-08 | 20 | 200 | 280 | 800 | 14.3 | 0 |
| Sample 8 69-09 | 20 | 200 | 280 | 800 | 14.1 | 0.5 |
| Sample 9 69-10 | 20 | 200 | 360 | 800 | 14.3 | 0.5 |
| Sample 10 69-11 | No Data | No Data | No Data | No Data | No Data | No Data |

The composite structures of Samples 1-10 were then evaluated for abrasiveness, softness, and drapeability. The results are summarized in Tables 8-11 below.

TABLE 8

Abrasiveness as a function of the kinetic coefficient of friction

| Sample Number | Coefficient of Friction MD Direction (1) (2) Meltblown Side against Meltblown Side (3) | Coefficient of Friction MD Direction(1) Meltblown Side against Smooth Steel (4) | Coefficient of Friction MD Direction(1) Spunbond Side against Smooth Steel (5) |
|---|---|---|---|
| Sample 1 69-02 | 0.77 | 0.06 | 0.03 |
| Sample 2 69-03 | 0.32 | 0.05 | 0.02 |
| Sample 3 69-04 | 0.30 | 0.06 | 0.03 |
| Sample 4 69-05 | 0.63 | 0.05 | 0.02 |
| Sample 5 69-06 | 0.86 | 0.05 | 0.03 |
| Sample 6 69-07 | 0.80 | 0.06 | 0.03 |
| Sample 7 69-08 | 0.45 | 0.06 | 0.02 |
| Sample 8 69-09 | 0.54 | 0.05 | 0.03 |

TABLE 8-continued

Abrasiveness as a function of the kinetic coefficient of friction

| Sample Number | Coefficient of Friction MD Direction (1) (2) Meltblown Side against Meltblown Side (3) | Coefficient of Friction MD Direction(1) Meltblown Side against Smooth Steel (4) | Coefficient of Friction MD Direction(1) Spunbond Side against Smooth Steel (5) |
|---|---|---|---|
| Sample 9 69-10 | 1.04 | 0.05 | 0.04 |
| Sample 10 69-11 | 0.60 | 0.05 | 0.04 |

(1)Coefficient of Friction measured according to Method C-1231 Coefficient of Friction. Average of three tests. Load cell = 100N, Clamps Distance = 138.5 mm; Crosshead Speed = 200 mm/minute,
(2) Typical Coefficient of Variance for the Coefficient of Friction was approximately 10%.
(3) Bottom of sled covered with experimental wipe with meltblown side facing down against a surface covered by a second layer of the wipe with meltblown surface of the wipe facing up.
(4) Bottom of sled covered with experimental wipe with meltblown side facing down against a surface of smooth steel.
(5) Bottom of sled covered with experimental wipe with spunbond side facing down against a surface of smooth steel.

In Table 8, above, the abrasiveness of each of the Samples 1-10 were evaluated based on the kinetic coefficient of friction for each of the samples. A high value suggests a rough surface better able for example to remove dried food or paint accidently contaminating areas outside the target area to paint. A low value would suggest mild abrasion such a needed for examples to cleaning a polished wooded surface where dust must be removed without risk of scratching the surface. As can be seen in the two far right columns, conducting the test against the surface of the sled (procedures (4) and (5)) provided (procedures (4) and (5)) little differentiation between the samples in the measured coefficient of friction. However, when procedure (3) was employed (meltblown surface against the identical meltblown surface) a difference in the kinetic coefficient of friction for each sample was observed. Samples 2, 3, and 7 all exhibited a kinetic coefficient of friction of less than 0.49, and therefore provided an abrasiveness that would be consider fine. Samples 1, 4, 8, and 10 exhibited a kinetic coefficient of friction between 0.5 and 0.79, and would therefore be considered a medium abrasive cleaning wipe. Samples 5 and 6 exhibited a kinetic coefficient of friction between 0.8 and 0.99, and would therefore be considered a course abrasive cleaning wipe. Finally, Sample 9 exhibited a kinetic coefficient of friction greater than 1.0, and would therefore be considered to be a very course abrasive cleaning wipe.

In addition to measuring the kinetic coefficient of friction of the sample wipes, SEM images of the surface of select cleaning wipes were also obtained. The following details outline the process used by our Peine Test laboratory to make the SEM images provided in FIGS. 4A-5B. The SEM Instrument was a PERSONAL SEM 75, and utilized a DESK V Sputterer (gold). 5 mm×5 mm samples were prepared and placed on a sample holder. The holder with sample was placed into the SEM instrument and the vacuum chamber was closed. The vacuum pump was started and once high vacuum was achieved the electron beam was turned on and optimum beam voltage was selected. The filament was increased to 70 to 80%, and then a spot was selected and magnified. The spot was then scanned to obtain the SEM image.

The SEM images were also used to measure the fiber diameters and calculate DTEX of the fibers. DTEX was calculated by the following formula where PLA density is taken as 1.24 grams/cm$^3$.
(Diameter in micrometers/2) squared X Pi X polymer density (g/cm$^3$)×0.01=DTEX (grams divided by 10000 meters). Fiber Diameters and DTEX are provided in Table 9 below.

Figure 4A:
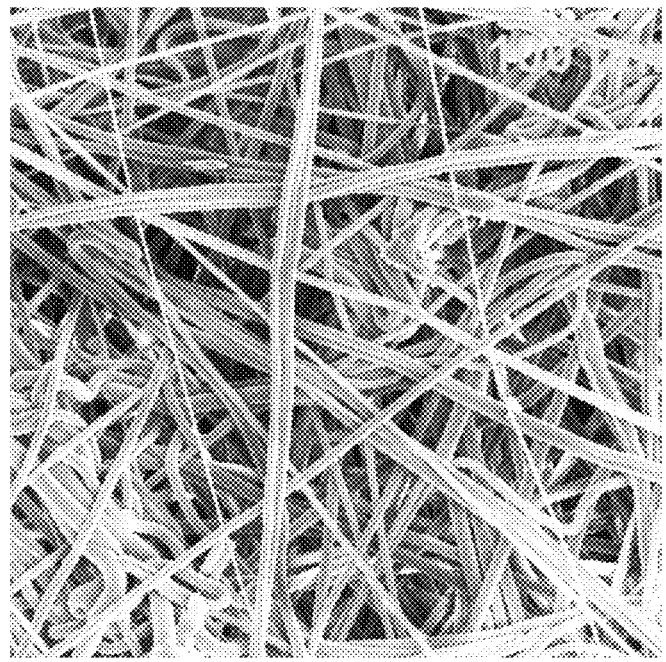
FIGS. 4A and 4B are SEM images of meltblown fibers on a surface of a meltblown web taken at a magnification of 500× and 750×, respectively.
Figure 4B:
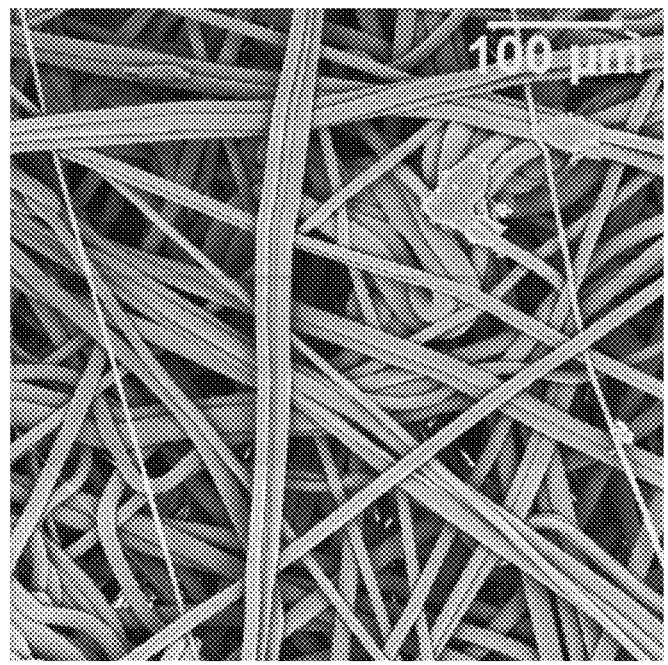
Figure 5A:
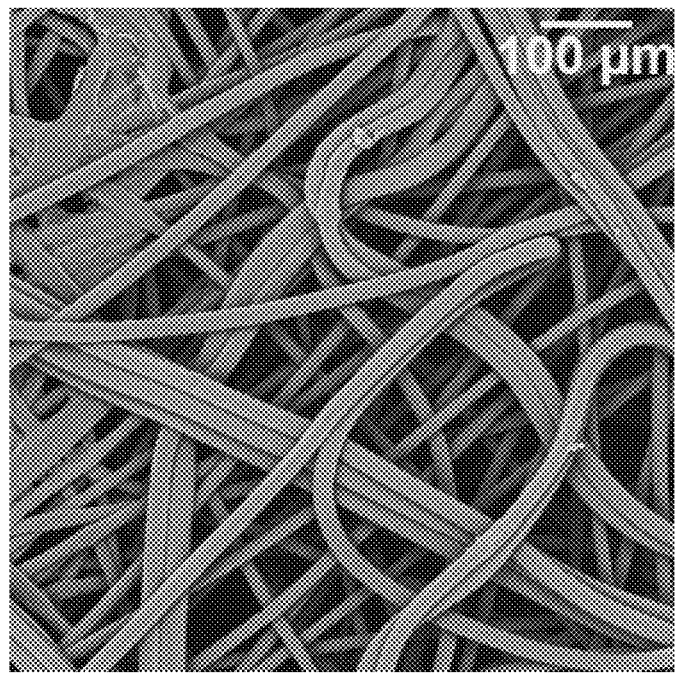
FIGS. 5A and 5B are SEM images of meltblown fibers on a surface of a meltblown web taken at a magnification of 500× and 750×, respectively.
Figure 5B:
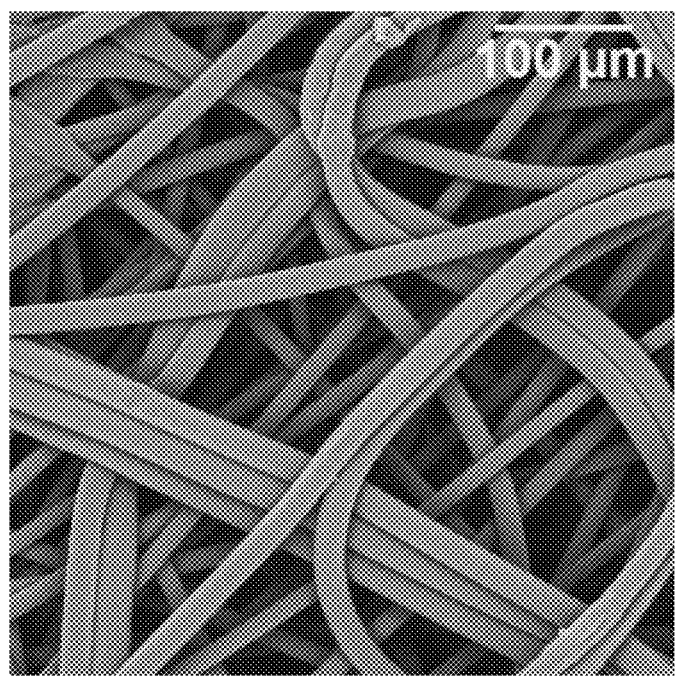

In this regard, FIGS. 4A and 4B are SEM images of the surface of the abrasive layer (i.e, meltblown web) of Sample 2 taken at a magnification of 500× and 750×, respectively. FIGS. 5A and 5B are SEM images of the surface of the abrasive layer (i.e, meltblown web) of Sample 5 taken at a magnification of 500× and 750×, respectively.

In the SEM image of Sample 2, which corresponds to a cleaning wipe having a surface with a fine abrasiveness, it can be seen that many of the meltblown fiber are conglomerated (i.e., married) to adjacent fiber to produce an uneven, abrasive surface. The uneven surface of the abrasive layer is even more pronounced in the SEM images of Samples 5 and 9. In particular, the surfaces of Samples 5 and 9 have a more complex topography with much curling of fibers and marrying of fibers.

As noted in Table 9, below Samples 5 and 9 show a significant difference in meltblown DTEX and meltblown fiber diameter in comparison to Samples 2 and 3. Unless otherwise stated, the measurements in Table 9 are from the meltblown side of cleaning wipe.

TABLE 9

Fiber Diameter and DTEX for Meltblown and spunbond fibers in Cleaning Wipes

| Sample No. | Fiber Diameter - Average (Micrometers) | Fiber Diameter - Standard Deviation | DTEX (grams) | DTEX Standard Deviation |
|---|---|---|---|---|
| Sample 2 | 8.06 | 2.16 | 0.67 | 0.34 |
| Sample 3 | 6.52 | 1.84 | 0.44 | 0.23 |
| Sample 5 | 12.17 | 1.89 | 1.60 | 0.45 |
| Sample 9* | 10.79 | 1.34 | 1.15 | 0.29 |
| Sample 9 - Spunbond side | 15.66 | 0.88 | 2.40. | 0.27 |

*Although Sample 9 exhibited an average fiber diameter of 10.79 micrometers, the average Kinetic Coefficient of Friction was 1.04, and therefore Sample 9 was classified as "very course" based on the measured abrasiveness.

TABLE 10

Bending Length

| Sample Number | Bending Length in MD direction with Meltblown Layer Up (cm) | Bending Length in MD direction with Spunbond Layer Up (cm) | Bending Length in CD direction with Meltblown Layer Up (cm) | Bending Length in CD direction with Spunbond Layer Up (cm) |
| --- | --- | --- | --- | --- |
| Sample 1 69-02 | 5.5 | 6.2 | 3.7 | 3.9 |
| Sample 2 69-03 | 5.5 | 6.2 | 4.2 | 4.3 |
| Sample 3 69-04 | 5.9 | 6.0 | 3.7 | 4.0 |
| Sample 4 69-05 | 5.5 | 6.3 | 4.2 | 4.3 |
| Sample 5 69-06 | 5.2 | 5.4 | 4.2 | 4.6 |
| Sample 6 69-07 | 5.4 | 6.2 | 3.9 | 4.1 |
| Sample 7 69-08 | 5.3 | 5.8 | 4.1 | 4.5 |
| Sample 8 69-09 | 6.0 | 6.6 | 4.0 | 4.4 |
| Sample 9 69-10 | 5.3 | 6.0 | 4.1 | 3.9 |
| Sample 10 69-11 | 5.4 | 7.0 | 4.4 | 4.2 |

(1) Bending Length measured according to Test C-1381 Bending Length with Sample Width = 25.0 mm, Sample Length = 250.0 mm, and waiting time = 8 +/- 2 seconds.
(2) Typical Coefficient of Variance for the Bending Length measurements was approximately 6%.

TABLE 11

Handle-O-Meter Stiffness (1)

| Sample Number | Stiffness H-O-M MD-Direction MB Side on top (Grams) | Stiffnes H-O-M MD-Direction SB Side on top (Grams) | Stiffnes H-O-M CD-Direction MB Side on top (Grams) | Stiffness H-O-M CD-Direction SB Side on top (Grams) |
| --- | --- | --- | --- | --- |
| Sample 1 69-02 | 30.00 | 26.23 | 15.53 | 14.50 |
| Sample 2 69-03 | 40.17 | 34.07 | 21.60 | 18.10 |
| Sample 3 69-04 | 39.90 | 25.57 | 21.00 | 14.23 |
| Sample 4 69-05 | 35.03 | 33.83 | 20.97 | 19.77 |
| Sample 5 69-06 | 28.47 | 27.70 | 16.23 | 17.40 |
| Sample 6 69-07 | 36.17 | 30.13 | 20.50 | 22.23 |
| Sample 7 69-08 | 39.60 | 35.87 | 26.37 | 23.97 |
| Sample 8 69-09 | 43.40 | 32.37 | 23.07 | 22.63 |
| Sample 9 69-10 | 25.53 | 29.30 | 15.90 | 16.73 |
| Sample 10 69-11 | 59.33 | 53.77 | 35.87 | 27.83 |

(1) Handle-O-Meter Stiffness measured according to CM-490 Handle-O-Meter.

The Bending Length of the composite structures, shown in Table 10 above, model the softness of the cleaning wipes. A low value of Bending Length suggests a wipe that is soft, drapeable and thus easily conformable to the shape of objects to be cleaned. Thus such a cleaning wipe might be useful for cleaning the inside of a drinking glass. A wipe with a high bending length would be stiff and strong and thus suggestive of a wipe for cleaning flat surfaces such as table tops or stove tops contaminated with dried or baked-on food. The observed range of bending lengths see in Table 10 may suggest minimum difference in softness for this set of wipes for our invention.

Handle-O-Meter results provide a numerical value to model the combination of the softness or stiffness and frictional properties of wipes of our invention. This test suggests a wider difference in the properties in the prepared samples then seen with the Bending Length. In particular, there is a 2× difference in the Handle-O-Meter value between Sample 10 and, for example, Samples 6 and 9. As noted above, a higher value of H-O-H suggests a relatively stiff wipe plus some input from frictional properties while a low value of H-O-H suggests a soft conformable wipe with low input from frictional properties.

The cleaning capability of the cleaning wipes prepared from Samples 1-10 were then evaluated for their effectiveness in cleaning stained surfaces. Coffee cups used by laboratory members were cleaned by lightly rubbing the inside of stained cups with wetted wipes selected from Samples 1-10. The stain from the coffee was removed with no visible damage to the inside of the cups.

The foregoing examples demonstrate that the inventors have developed effective cleaning wipes comprising a 100% sustainable polymer content. In certain embodiments, the wipes have a spunbond/meltblown (S/M) structure such that the at least two layers provide different functions that can be made in a single step employing up to 100% sustainable polymer content. In addition, the cleaning wipes in accordance with embodiments of the invention can be engineered to provide different degrees or aggressiveness of scrubbing action on one side while the other side can be both strong to support the weaker meltblown abrasive side while being useful for removal of dust, wiping a surface dry, and being soft and smooth to the user's touch. The wipe of our design can be designed to be comprised of up to 100% PLA of different molecular weights or optical purities. In a particularly preferred structure one side of the cleaning wipe is comprised of 100% PLA meltblown fibers while the second side is comprised of 100% PLA spunbond fibers. The aggressiveness of the cleaning wipe, as for example indicated by a property such as coefficient of friction, can be governed by the details of the meltblown process used to blow the PLA meltblown fibers onto the spunbond nonwoven fabric.

In the following example, a process for preparing a wipe having a very coarse abrasiveness is shown.

First, a spunbond web comprising 100% PLA bicomponent fibers is made on a pilot line equipped with a Reicofil-4 spinning beam. A press roll (R-4 press roll) is positioned on the collection surface downstream of where the filaments are to be deposited on the collection surface. An Ionis Elektrostatik Discharging Electrode E3412 (i.e. ionization bar) extends over the collection surface in the cross direction and is approximately 1 to 3 inches above the collection surface and 2 to 3 inches upstream of the R-4 press roll.

A curtain of bicomponent 30/70 NatureWorks Grade 6752/NatureWorks Grade 6202/sheath/core fibers is spun and laid on the spunbond machine collection surface (machine wire) such that the ionization bars as discussed above minimize static in the resulting web. Spin beam temperatures are 235° C. at the extruder and 240° C. at the die. The spunbond fibers are drawn with a fiber draw speed of 3800 m/min. The resulting web of bicomponent 30/70 NatureWorks Grade 6752/NatureWorks Grade 6202/sheath/core fibers, is deposited on the machine wire, and then advances continuously into and through the meltblown web forming station of the pilot line.

A series of wipes of this invention are made comprised of 100% PLA meltblown fibers blown from a meltblowing beam directly on the above described advancing web of 100% PLA spunbond fabric supported on the machine wire. The meltblowing process is first operated with extruder temperature at 250° C., an Adapter Zone temperature at 250° C. and a temperature at the die of 250° C. The hot air temperature and volume supplied to the meltblown process are listed in Table 12 below. The volume of hot air to the meltblown process is supplied to both sides of the curtain of meltblown fibers exiting the die. Other key process conditions are maintained as listed in Table 12 during production of the very coarse wipes. Basis weight of the finished wipe may be controlled during trial production by carefully balancing both spunbond and meltblown extruder thru-put with the speed of the machine wire as well understood by those skilled in the spunmelt (SM) art. As noted previously, care should be given when calender bonding the composite web.

The resulting webs comprising 100% PLA meltblown fibers deposited on 100% bicomponent PLA fibers are then thermally bonded using the calender pattern roll and anvil (smooth)roll such that the smooth roll contacts the spunbond side of the SM composite while the patterned roll contacts the meltblown side of the web. The patterned roll pattern and the bonding pressure and temperatures are carefully selected to provide sufficient bonding between spunbond and meltblown fibers to insure adequate abrasion resistance so a minimum number of meltblown or spunbond fibers are deposited on the surface being cleaned but the scrubby surface of the meltblown surface is preserved during the bonding process to insure aggressive cleaning of the hard-to-clean surface.

To achieve this balance of properties a calender roll pattern is selected with a % bond area of less than about 30%. For Samples P1-P10, a large Hexadot calender patterned roll is employed with bond area of approximately 12%. To prevent sticking and insure ease of release between to surfaces of the wipe web and the calender rolls both the patterned calender and smooth roll surfaces are treated with anti-stick release coating. An example of such a coating is provided by Farrell and Gillespie in EP 1,432,860.

A passive static bar is positioned a few cm downstream of the calender and a second Elektrostatik Discharging Electrode E3412 active ionization bar is positioned just before the winder are used to manage static generation.

The rolls comprised of the composite web are slit and wound up for collection at the winder. The resulting composite web may then be used to manufacture cleaning wipes having an abrasive surface that is considered very coarse. The expected abrasiveness of Samples P1-P10 are provided in Table 13 below. Very course cleaning wipes in accordance with the invention may be particularly useful for cleaning surface with minimum, if any, damage to the substrate being cleaned and minimum deposit of abraded fibers from the surface of the cleaning wipe.

TABLE 12

| | Meltblown Process conditions | | | | | | | |
|---|---|---|---|---|---|---|---|---|
| Sample No. | Supplied Air Temperature to Meltblown Process (° C.) | Maintained Air Temperature to Meltblown Process (° C.) | Relative Thru-put (RPM) | Process Air (m³/hr) | DCD (relative mm above the wire) | Suction Blower (RPM) | Calculated Meltblown Basis Weight (GSM) | Addition of Sukano Additive S546-Q1 (%) |
| P-1 | 270 | 242-252 | 20 | 200 | 400 | 800 | 10.7 | 0.5 |
| P-2 | 270 | 242-252 | 20 | 150 | 360 | 800 | 10.7 | 0.5 |
| P-3 | 270 | 242-252 | 20 | 150 | 400 | 800 | 10.7 | 0.5 |
| P-4 (1) | 300 | 272-282 | 20 | 1000 | 180 | 1200 | 10.7 | 0.5 |

TABLE 12-continued

Meltblown Process conditions

| Sample No. | Supplied Air Temperature to Meltblown Process (° C.) | Maintained Air Temperature to Meltblown Process (° C.) | Relative Thru-put (RPM) | Process Air (m³/hr) | DCD (relative mm above the wire) | Suction Blower (RPM) | Calculated Meltblown Basis Weight (GSM) | Addition of Sukano Additive S546-Q1 (%) |
|---|---|---|---|---|---|---|---|---|
| P-5 (1) | 300 | 272-282 | 20 | 1200 | 180 | 1200 | 10.7 | 0.5 |
| P-6 (1) | 300 | 272-282 | 20 | 1350 | 180 | 1200 | 10.7 | 0.5 |
| P-7 (1) | 315 | 287-297 | 20 | 1000 | 180 | 1200 | 10.7 | 0.5 |
| P-8 (1) | 315 | 287-297 | 20 | 1200 | 180 | 1200 | 10.7 | 0.5 |
| P-9 (1) | 315 | 287-297 | 20 | 1350 | 180 | 1200 | 10.7 | 0.5 |
| P-10 (1) | 315 | 287-297 | 20 | 1350 | 180 | 1200 | 10.7 | 0.0 |

(1) Meltblown process condition is producing shot. Meltblown shot is a coarse nonuniform layer of meltblown containing random globules of PLA interconnected with the normal meltblown strands. Such random globules significantly increase the roughness of the meltblown surface.

TABLE 13

Kinetic Coefficient of Friction

| Sample No. | Coefficient of Friction MD Direction(1) (2) Meltblown Side against Meltblown Side (3) | Coefficient of Friction MD Direction(1) Meltblown Side against Smooth Steel (4) | Coefficient of Friction MD Direction(1) Spunbond Side against Smooth Steel (5) |
|---|---|---|---|
| P-1 | 1.15 | 0.07 | 0.05 |
| P-2 | 1.15 | 0.07 | 0.05 |
| P-3 | 1.25 | 0.07 | 0.05 |
| P-4 | 1.10 | 0.07 | 0.05 |
| P-5 | 1.20 | 0.07 | 0.05 |
| P-6 | 1.30 | 0.07 | 0.05 |
| P-7 | 1.30 | 0.07 | 0.05 |
| P-8 | 1.40 | 0.07 | 0.05 |
| P-9 | 1.50 | 0.07 | 0.05 |
| P-10 | 1.60 | 0.07 | 0.05 |

(1) Coefficient of Friction is measured according to Method C-1231 Coefficient of Friction. Average of three tests. Load cell = 100N, Clamps Distance = 138.5 mm; Crosshead Speed = 200 mm/minute.
(2) Typical Coefficient of Variance for the Coefficient of Friction is approximately 10%.
(3) Bottom of sled is covered with experimental wipe with meltblown side facing down against a surface covered by a second layer of the wipe with meltblown surface of the wipe facing up.
(4) Bottom of sled is covered with experimental wipe with meltblown side facing down against a surface of smooth steel.
(5) Bottom of sled is covered with experimental wipe with spunbond side facing down against a surface of smooth steel.

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Summary of the Claims

In one embodiment, a cleaning wipe having a high sustainable polymer content is provided in which the cleaning wipe comprises a fibrous layer comprising fibers comprised of a melt spinnable sustainable polymer; and an abrasive layer comprising meltblown fibers comprised of a melt spinnable sustainable polymer, the abrasive layer defining an outer surface of the cleaning wipe, and having a plurality of abrasive structures formed thereon in which the abrasive structures comprise conglomerated fibers, meltblown shot, fibers having average diameters greater than 4 micrometers, and fibers having a tortuous geometry, and wherein the melt spinnable sustainable polymer content of the cleaning wipe is at least 50 weight % by weight of the cleaning wipe.

In one embodiment according to the preceding paragraph, the melt spinnable sustainable polymer content of the cleaning wipe is at least 60% by weight, based on the total weight of the cleaning wipe.

In one embodiment according to one or more of the two preceding paragraphs, the melt spinnable sustainable polymer content of the cleaning wipe is at least 65% by weight, based on the total weight of the cleaning wipe.

In one embodiment according to one or more of the preceding three paragraphs, the melt spinnable sustainable polymer content of the cleaning wipe is at least 70% by weight, based on the total weight of the cleaning wipe.

In one embodiment according to one or more of the preceding four paragraphs, the melt spinnable sustainable polymer content of the cleaning wipe is at least 75% by weight, based on the total weight of the cleaning wipe.

In one embodiment according to one or more of the preceding five paragraphs, the melt spinnable sustainable polymer content of the cleaning wipe is at least 80% by weight, based on the total weight of the cleaning wipe.

In one embodiment according to one or more of the preceding six paragraphs, the melt spinnable sustainable polymer content of the cleaning wipe is at least 85% by weight, based on the total weight of the cleaning wipe.

In one embodiment according to one or more of the preceding seven paragraphs, the melt spinnable sustainable polymer content of the cleaning wipe is at least 90% by weight, based on the total weight of the cleaning wipe.

In one embodiment according to one or more of the preceding eight paragraphs, the melt spinnable sustainable polymer content of the cleaning wipe is at least 95% by weight, based on the total weight of the cleaning wipe.

In one embodiment according to one or more of the preceding nine paragraphs, the melt spinnable sustainable polymer content of the cleaning wipe is 100% by weight, based on the total weight of the cleaning wipe.

In one embodiment according to one or more of the preceding ten paragraphs, the fibrous layer comprises a spunbond nonwoven fabric.

In one embodiment according to one or more of the preceding eleven paragraphs, the fibrous layer comprises a polylactic acid (PLA).

In one embodiment according to one or more of the preceding twelve paragraphs, the meltblown fibers comprise a polylactic acid (PLA).

In one embodiment according to one or more of the preceding thirteen paragraphs, the meltblown fibers are self-bonded to the fibrous layer.

In one embodiment according to one or more of the preceding fourteen paragraphs, the fibrous layer has been thermally bonded to the abrasive layer via a patterned calender roll.

In one embodiment according to one or more of the preceding fifteen paragraphs, an outer surface of the meltblown web includes a bonding pattern formed thereon.

In one embodiment according to one or more of the preceding sixteen paragraphs, the bonding pattern covers less than 30% of a surface area of the abrasive layer.

In one embodiment according to one or more of the preceding two paragraphs, the bonding pattern covers from about 10 to 20% of a surface area of the abrasive layer.

In one embodiment according to one or more of the preceding three paragraphs, the bonding pattern covers from about 10 to 15% of a surface area of the abrasive layer.

In one embodiment according to one or more of the preceding nineteen paragraphs, an outer surface of the wipe exhibits a kinetic coefficient of friction that is at least 0.2 as measured in accordance with Method C-1231 Coefficient of Friction, and in which in the measurement an outer surface of the meltblown web is positioned in a face-to-face relation with an outer surface of an identical meltblown web.

In one embodiment according to one or more of the preceding twenty paragraphs, an outer surface of the cleaning wipe exhibits a kinetic coefficient of friction that is from 0.2 to 0.49, 0.5 to 0.79, 0.8 to 0.99, or greater than 1.0 as measured in accordance with Method C-1231 Coefficient of Friction, and in which in the measurement an outer surface of the meltblown web is positioned in a face-to-face relation with an outer surface of an identical meltblown web.

In one embodiment according to one or more of the preceding twenty-one paragraphs, the cleaning wipe has a basis weight from about 15 to 100 g/m$^2$, such as a basis weight from about 30 to 60 g/m$^2$.

In one embodiment according to one or more of the preceding twenty-two paragraphs, the fibrous layer has a basis weight from about 15 to 30 g/m$^2$, and the abrasive layer has a basis weight from about 15 to 30 g/m$^2$.

In one embodiment according to one or more of the preceding twenty-three paragraphs, the meltblown fibers have an average fiber diameter greater than about 4 micrometers.

In one embodiment according to one or more of the preceding twenty-four paragraphs, the meltblown fibers have an average fiber diameter from about 4 to 8.5 micrometers, from about 6 to 8 micrometers, from about 8.5 to 10.5 micrometers, from about 10.5 to 12 micrometers, or from about 12.5 to 25 micrometers.

In one embodiment according to one or more of the preceding twenty-five paragraphs, the fibrous layer comprises a spunbond nonwoven fabric comprising continuous monocomponent filaments.

In one embodiment according to one or more of the preceding twenty-six paragraphs, the fibrous layer comprises a spunbond nonwoven fabric comprising continuous bicomponent filaments.

In one embodiment according to the preceding paragraph, the bicomponent filaments comprise a core comprising PLA and a sheath comprising PLA, such as an embodiment in which the PLA of the sheath and the PLA of the core have a different melt flow rate from each other, or have the same melt flow rate as each other.

In one embodiment according to one or more of the preceding twenty-seven paragraphs, the fibers of the spunbond nonwoven fabric comprise bicomponent filaments having a core comprising PLA and a sheath comprising a synthetic polymer, such as an embodiment in which the synthetic polymer is a polyolefin, such as polyethylene or polypropylene, or a polyester.

In one embodiment according to one or more of the preceding twenty-eight paragraphs, the fibrous layer comprises a spunbond nonwoven fabric comprising a plurality of continuous filaments wherein the sustainable polymer content of the continuous filaments is at least 50%.

In one embodiment according to one or more of the preceding twenty-nine paragraphs, the fibrous layer comprises a spunbond nonwoven fabric comprising a plurality of continuous filaments wherein the sustainable polymer content of the continuous filaments is at least 60%.

In one embodiment according to one or more of the preceding thirty paragraphs, the fibrous layer comprises a spunbond nonwoven fabric comprising a plurality of continuous filaments wherein the sustainable polymer content of the continuous filaments is at least 70%.

In one embodiment according to one or more of the preceding thirty-one paragraphs, the fibrous layer comprises a spunbond nonwoven fabric comprising a plurality of continuous filaments wherein the sustainable polymer content of the continuous filaments is at least 80%.

In one embodiment according to one or more of the preceding thirty-one paragraphs, the fibrous layer comprises a spunbond nonwoven fabric comprising a plurality of continuous filaments wherein the sustainable polymer content of the continuous filaments is at least 90%.

In one embodiment according to one or more of the preceding thirty-two paragraphs, the fibrous layer comprises a spunbond nonwoven fabric comprising a plurality of continuous filaments wherein the sustainable polymer content of the continuous filaments is at least 100%.

In one embodiment according to one or more of the preceding thirty-three paragraphs, the meltblown fibers are a blend of PLA and a reclaimed synthetic polymer.

In one embodiment according to one or more of the preceding thirty-four paragraphs, the meltblown fibers are a blend of reclaimed PLA and a reclaimed synthetic polymer.

In one embodiment according to one or more of the preceding thirty-five paragraphs, the fibrous layer comprises a spunbond nonwoven fabric comprising a plurality of fibers that are bonded to each other to form a coherent web, and wherein one or more of the meltblown fibers or the fibers of the fibrous layer comprise a blend of a polylactic acid (PLA) and at least one alkane sulfonate, such as a secondary alkane sulfonate.

In one embodiment according to the preceding paragraph, the blend is present at a surface of the plurality of fibers.

In one embodiment according to one or more of the two preceding paragraphs, the at least one alkane sulfonate comprises an alkane chain having from $C_{10}$-$C_{18}$, and wherein at least one of the secondary carbons of the alkane chain includes a sulfonate moiety.

In one embodiment according to one or more of the preceding three paragraphs, the at least one alkane sulfonate has one of the following structures:

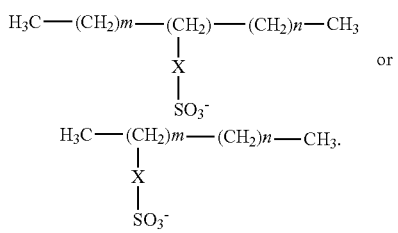

wherein m+n is a number between 7 and 16, and X is independently a $C_1$-$C_4$ alkyl or absent.

In one embodiment according to one or more of the preceding four paragraphs, the at least one alkane sulfonate has the following structure:

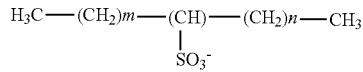

wherein m+n is a number between 8 and 15.

In one embodiment according to the preceding five paragraphs, the blend is present at a surface of the plurality of fibers.

In one embodiment according to one or more of the preceding six paragraphs, the at least one alkane sulfonate comprises an alkane.

In one embodiment according to one or more of the preceding seven paragraphs, m+n is a number between 11 and 14.

In one embodiment according to one or more of the preceding eight paragraphs, the at least one alkane sulfonate comprises a salt of sodium or potassium.

In one embodiment according to one or more of the preceding nine paragraphs, the at least one alkane sulfonate is present in an amount ranging from about 0.0125 to 2.5 weight percent, based on the total weight of the fiber.

In one embodiment according to one or more of the preceding ten paragraphs, the fibers of the spunbond nonwoven fabric have a sheath/core bicomponent arrangement in which the blend is present in the sheath, and wherein the alkane sulfonate is present in the sheath in an amount ranging from about 0.1 to 0.75 weight percent, from about 0.2 to 0.6 weight percent, or from about 0.3 to 0.4 weight percent, based on the total weight of the sheath.

A process for preparing a cleaning wipe according to one or more of the preceding forty-nine paragraphs comprising the steps of providing a spunbond nonwoven fabric comprising fibers comprised of a melt spinnable sustainable polymer; blowing a stream of meltblown fibers comprising a melt spinnable sustainable polymer onto a surface of the spunbond nonwoven fabric to form an abrasive layer of the composite web, wherein the meltblown fibers are blown under processing conditions that form abrasive structures on a surface of the composite web; and bonding the composite web, and wherein a melt spinnable sustainable polymer content of the composite web is at least 50% by weight of the composite web.

In additional aspects, a process for preparing a composite web for use as a cleaning wipe having a high sustainable polymer content is provided in which the process comprises: providing a spunbond nonwoven fabric comprising fibers comprised of a melt spinnable sustainable polymer; blowing a stream of meltblown fibers comprising a melt spinnable sustainable polymer onto a surface of the spunbond nonwoven fabric to form an abrasive layer of the composite web, wherein the meltblown fibers are blown under processing conditions that form abrasive structures on a surface of the composite web; and bonding the composite web, and wherein a melt spinnable sustainable polymer content of the composite web is at least 50% by weight of the composite web.

In one embodiment according to the preceding paragraph, the melt spinnable sustainable polymer content of the composite web is at least 60% by weight, based on the total weight of the composite web.

In one embodiment according to one or more of the preceding two paragraphs, the melt spinnable sustainable polymer content of the composite web is at least 60% by weight, based on the total weight of the composite web.

In one embodiment according to one or more of the preceding three paragraphs, the melt spinnable sustainable polymer content of the composite web is at least 70% by weight, based on the total weight of the composite web.

In one embodiment according to one or more of the preceding four paragraphs, the melt spinnable sustainable polymer content of the composite web is at least 75% by weight, based on the total weight of the composite web.

In one embodiment according to one or more of the preceding five paragraphs, the melt spinnable sustainable polymer content of the composite web is at least 80% by weight, based on the total weight of the composite web.

In one embodiment according to one or more of the preceding six paragraphs, the melt spinnable sustainable polymer content of the composite web is at least 85% by weight, based on the total weight of the composite web.

In one embodiment according to one or more of the preceding seven paragraphs, the melt spinnable sustainable polymer content of the composite web is at least 90% by weight, based on the total weight of the composite web.

In one embodiment according to one or more of the preceding eight paragraphs, the melt spinnable sustainable polymer content of the composite web is at least 95% by weight, based on the total weight of the composite web.

In one embodiment according to one or more of the preceding nine paragraphs, the melt spinnable sustainable polymer content of the composite web is 100% by weight, based on the total weight of the composite web.

In one embodiment according to one or more of the preceding ten paragraphs, the fibers of the spunbond nonwoven fabric comprise a polylactic acid (PLA).

In one embodiment according to one or more of the preceding eleven paragraphs, the meltblown fibers comprise a polylactic acid (PLA).

In one embodiment according to one or more of the preceding twelve paragraphs, the process further comprises a step of self-bonding the meltblown fibers to the spunbond nonwoven fabric and/or a step of thermally bonding the spunbond nonwoven fabric to the abrasive layer via a patterned calender roll.

In one embodiment according to one or more of the preceding thirteen paragraphs, the abrasive layer includes a bonding pattern formed thereon.

In one embodiment according to one or more of the preceding fourteen paragraphs, the bonding pattern covers less than 30% of a surface area of the abrasive layer.

In one embodiment according to one or more of the preceding two paragraphs, the bonding pattern covers from about 10 to 20% of a surface area of the abrasive layer.

In one embodiment according to one or more of the preceding three paragraphs, bonding pattern covers from about 10 to 15% of a surface area of the abrasive layer.

In one embodiment according to one or more of the preceding sixteen paragraphs, an outer surface of the abrasive layer exhibits a kinetic coefficient of friction that is at least 0.2 as measured in accordance with Method C-1231 Coefficient of Friction, and in which in the measurement an outer surface of the meltblown web is positioned in a face-to-face relation with an outer surface of an identical abrasive layer.

In one embodiment according to the preceding paragraph, an outer surface of the abrasive layer exhibits a kinetic coefficient of friction that is from 0.2 to 0.49, from 0.5 to 0.79, from 0.8 to 0.99, or greater than 1.0 as measured in accordance with Method C-1231 Coefficient of Friction, and in which in the measurement an outer surface of the abrasive layer is positioned in a face-to-face relation with an outer surface of an identical abrasive layer.

In one embodiment according to one or more of the preceding eighteen paragraphs, the meltblown fibers have an average fiber diameter greater than about 4 micrometers, such as from about 4 to 8.5 micrometers, from about 6 to 8 micrometers, from about 8.5 to 10.5 micrometers, from about 10.5 to 12 micrometers, or from about 12.5 to 25 micrometers.

In one embodiment according to one or more of the preceding nineteen paragraphs, the spunbond nonwoven fabric comprises continuous monocomponent filaments.

In one embodiment according to one or more of the preceding twenty paragraphs, the spunbond nonwoven fabric comprising continuous bicomponent filaments.

In one embodiment according to the preceding paragraph, the bicomponent filaments comprise a core comprising PLA and a sheath comprising PLA, such as an embodiment in which the PLA of the sheath and the PLA of the core have a different melt flow rate from each other, or the PLA of the sheath and the PLA of the core have the same melt flow rate. In some embodiments according to the preceding paragraph, the bicomponent filaments comprise a core comprising a synthetic polymer and a sheath comprising PLA, such as a sheath comprising PLA and a core comprising a synthetic polymer, such as a polyolefin (e.g., polyethylene or polypropylene) or a polyester. In other embodiments according to the preceding paragraph, the bicomponent filaments comprise a sheath comprising a synthetic polymer and a core comprising PLA, such as a core comprising PLA and a sheath comprising a synthetic polymer, such as a polyolefin (e.g., polyethylene or polypropylene) or a polyester.

In one embodiment according to one or more of the preceding twenty-one paragraphs, the spunbond nonwoven fabric comprises a plurality of continuous filaments wherein the sustainable polymer content of the continuous filaments is at least 50%, such as at least 60%, at least 70%, at least 80%, at least 90%, or 100%.

In one embodiment according to one or more of the preceding twenty-two paragraphs, the meltblown fibers are a blend of PLA and a reclaimed synthetic polymer.

In one embodiment according to one or more of the preceding twenty-three paragraphs, the meltblown fibers are a blend of reclaimed PLA and a reclaimed synthetic polymer.

In one embodiment according to one or more of the preceding twenty-four paragraphs, the spunbond nonwoven fabric and the meltblown fibers comprise a blend of a polylactic acid (PLA) and at least one secondary alkane sulfonate.

In one embodiment according to one or more of the preceding twenty-five paragraphs, the blend is present at a surface of the fibers.

In one embodiment according to one or more of the preceding twenty-six paragraphs, the at least one secondary alkane sulfonate comprises an alkane chain having from $C_{10}$-$C_{18}$, and wherein at least one of the secondary carbons of the alkane chain includes a sulfonate moiety.

In one embodiment according to one or more of the preceding twenty-seven paragraphs, the at least one secondary alkane sulfonate has one of the following structures:

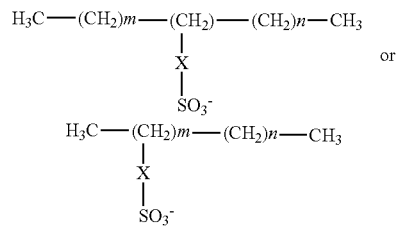

wherein m+n is a number between 7 and 16, and X is independently a $C_1$-$C_4$ alkyl or absent.

In one embodiment according to one or more of the preceding twenty-eight paragraphs, the blend is present at a surface of the fibers.

In one embodiment according to one or more of the preceding twenty-nine paragraphs, the at least one secondary alkane sulfonate the at least one secondary alkane sulfonate has the following structure:

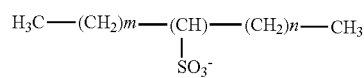

wherein m+n is a number between 8 and 15.

In one embodiment according to one or more of the preceding thirty paragraphs, m+n is a number between 11 and 14.

In one embodiment according to one or more of the preceding thirty-one paragraphs, the at least one secondary alkane sulfonate comprises a salt of sodium or potassium.

In one embodiment according to one or more of the preceding thirty-two paragraphs, the at least one secondary alkane sulfonate is present in an amount ranging from about 0.0125 to 2.5 weight percent, based on the total weight of the fiber, such as an amount ranging from about 0.1 to 0.75 weight percent, from about 0.2 to 0.6 weight percent, or from about 0.3 to 0.4 weight percent, based on the total weight of the sheath.

In one embodiment according to one or more of the preceding thirty-three paragraphs, the step of providing a spunbond nonwoven fabric comprises providing a stream of molten or semi-molten melt spinnable sustainable polymer; forming a plurality of continuous filaments comprising the melt spinnable sustainable polymer; depositing the plurality continuous filaments onto a collection surface; and exposing the plurality of continuous filaments to ions.

Additional aspects of the invention are directed to a system for preparing a composite web having a high sustainable content, the system comprising: a first source of a melt spinnable sustainable polymer configured to provide a stream of molten or semi-molten sustainable polymer resin; a spunbond spin beam in fluid communication with the first source of the melt spinnable sustainable polymer, the spin beam configured to extrude and draw a plurality of continuous filaments; a collection surface disposed below an outlet of the spin beam onto which the continuous filaments are deposited to form a spunbond nonwoven fabric; a second source of a melt spinnable sustainable polymer configured to provide a second stream of molten or semi-molten sustainable polymer resin; a meltblown spin beam disposed downstream of the spunbond spin beam, and in fluid communication with the second source of the melt spinnable sustainable polymer, the meltblown spin beam configured to extrude a plurality of meltblown fibers that are deposited on the spunbond nonwoven fabric; and a calender positioned downstream of the meltblown spin beam.

In one embodiment of the system according to the preceding claim, the system further comprises a first ionization source disposed downstream of a point at where the continuous filaments are deposited on the collection surface, and upstream of the meltblown spin beam, wherein the first ionization source is positioned and arranged to expose the continuous filaments to ions.

In one embodiment according to the preceding claim, the system further comprises a second ionization source disposed proximate to the calender.

In one embodiment according to one or more of the preceding two claims, the system further comprises a source of a secondary alkane sulfonate that is in fluid communication with one or more of the first and second sources of melt spinnable sustainable polymer.

What is claimed is:

1. A method of making a cleaning wipe having a high sustainable content, the method comprising:
providing a fibrous layer comprising fibers comprised of a melt spinnable sustainable polymer; and
forming an abrasive layer overlying the fibrous layer, the abrasive layer comprising meltblown fibers comprised of a melt spinnable sustainable polymer, the abrasive layer defining an outer surface of the cleaning wipe, and having a plurality of abrasive structures formed thereon in which the abrasive structures comprise two or more of conglomerated fibers, meltblown shot, fibers having average diameters greater than 4 micrometers and fibers having a tortuous geometry, and wherein the melt spinnable sustainable polymer content of the cleaning wipe is at least 50 weight % by weight of the cleaning wipe, and wherein said outer surface of the wipe exhibits an abrasiveness selected from the group consisting of 1) fine fibers having a kinetic coefficient of friction from 0.2 to 0.49 and average fiber diameters ranging from 4 to 8.5 micrometers; 2) medium fibers having a kinetic coefficient of friction from 0.5 to 0.79 and average fiber diameters ranging from 8.5 to 10.5 micrometers; 3) coarse fibers having a kinetic coefficient of friction from 0.8 to 0.99 and average fiber diameters ranging from 10.5 to 12.5 micrometers.

2. The method according to claim 1, wherein the fibrous layer is selected from the group consisting of carded webs, spunbond webs, and composite webs having a spunbond/meltblown/spunbond configuration.

3. The method according to claim 1, wherein the melt spinnable sustainable polymer content of the cleaning wipe is at least 60% by weight, based on the total weight of the cleaning wipe.

4. The method according to claim 1, wherein the fibrous layer comprises a spunbond nonwoven fabric.

5. The method according to claim 1, wherein the fibrous layer comprises a polylactic acid (PLA).

6. The method according to claim 1, wherein the meltblown fibers comprise a polylactic acid (PLA).

7. The method according to claim 1, further comprising a step of self-bonding the meltblown fibers to the fibrous layer.

8. The method according to claim 1, further comprising a step of thermally bonding the abrasive layer to the fibrous layer via a patterned calender roll.

9. The method according to claim 1, wherein an outer surface of the abrasive layer includes a bonding pattern formed thereon.

10. The method according to claim 9, wherein the bonding pattern covers less than 30% of a surface area of the abrasive layer.

11. The method according to claim 1, wherein said outer surface of the wipe exhibits a kinetic coefficient of friction from 0.2 to 0.49 as measured in accordance with Method 01231 Coefficient of Friction, and in which in the measurement an outer surface of the meltblown web is positioned in a face-to-face relation with an outer surface of an identical meltblown web.

12. The method according to claim 1, wherein the cleaning wipe has a basis weight from about 15 to 100 g/m$^2$.

13. The method according to claim 1, wherein the fibrous layer comprises a spunbond nonwoven fabric comprising continuous monocomponent filaments and/or continuous bicomponent filaments.

14. The method according to claim 13, wherein the continuous filaments are bicomponent filaments comprising a core comprising PLA and a sheath comprising PLA, and wherein the PLA of the sheath and the PLA of the core have a different melt flow rate from each other.

15. The method according to claim 13, wherein the continuous filaments are bicomponent filaments comprising a core comprising a synthetic polymer and a sheath comprising PLA, or wherein the continuous bicomponent filaments comprise a core comprising PLA and a sheath comprising a polyolefin or a polyester.

16. The method according to claim 1, wherein the fibers of at least one of the fibrous layer and abrasive layer comprise an aliphatic polyester.

17. The method according to claim 16, wherein the aliphatic polyester comprises one or more aliphatic polyester polymers selected from the group consisting of polyhydroxybutyrate, poly-(hydroxybutyrate-co-hydroxyvalerate), poly- (hydroxybutyrate-co- polyhydroxyhexanoate), polyglycolic acid, poly-(epsilon caprolactone), polylactic acid, polybutylene succinate, polyethylene succinate, polybutylene adipate, polyethylene adipate, and polytetramethylene adipate/terephthalate.

18. The method according to claim 16, wherein the fibers of the fibrous layer and/or abrasive layer comprise bicomponent fibers having a sheath comprising PLA and a core comprising PLA, and wherein the PLA of the core has a lower % D isomer content than the PLA of the sheath.

19. The method according to claim 1, further comprising a step of exposing the fibers of the fibrous layer to a stream of ions.

20. The method according to claim 1, wherein the fibrous layer comprises a spunbond nonwoven fabric comprising a plurality of fibers that are bonded to each other to form a coherent web, and wherein one or more of the meltblown fibers or the fibers of the fibrous layer comprise a blend of a polylactic acid (PLA) and at least one alkane sulfonate.

* * * * *